United States Patent
Kasutani et al.

(10) Patent No.: US 7,920,164 B2
(45) Date of Patent: Apr. 5, 2011

(54) VIEWING SURVEILLANCE SYSTEM FOR CARRYING OUT SURVEILLANCE INDEPENDENT OF A BROADCASTING FORM

(75) Inventors: Eiji Kasutani, Tokyo (JP); Akio Yamada, Tokyo (JP); Kota Iwamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 1438 days.

(21) Appl. No.: 10/558,687

(22) PCT Filed: Jun. 24, 2004

(86) PCT No.: PCT/JP2004/008903
§ 371 (c)(1),
(2), (4) Date: Dec. 19, 2005

(87) PCT Pub. No.: WO2005/011294
PCT Pub. Date: Feb. 3, 2005

(65) Prior Publication Data
US 2007/0052802 A1 Mar. 8, 2007

(30) Foreign Application Priority Data
Jul. 28, 2003 (JP) ................. 2003-280750

(51) Int. Cl.
H04N 7/18 (2006.01)
H04N 7/16 (2006.01)
G06K 9/54 (2006.01)
G06K 9/46 (2006.01)
G06K 9/00 (2006.01)

(52) U.S. Cl. .......... 348/143; 725/19; 382/305; 382/190; 382/165

(58) Field of Classification Search ............ 725/19; 348/143; 382/305, 190, 165
See application file for complete search history.

(56) References Cited

U.S. PATENT DOCUMENTS
4,697,209 A * 9/1987 Kiewit et al. ............. 725/19
(Continued)

FOREIGN PATENT DOCUMENTS
EP 1 052 854 B1 1/2003
(Continued)

OTHER PUBLICATIONS
A. Yamada, "MPEG-7 Visual Tutorial," pp. 45-54, Multimedia Research Laboratories, NEC. Corp.

*Primary Examiner* — Hoang-Vu A Nguyen-Ba
(74) *Attorney, Agent, or Firm* — Foley & Lardner LLP

(57) ABSTRACT

A viewing surveillance system which make it possible to carry out the viewing surveillance independently from the broadcasting form like analog broadcasting or digital broadcasting. The viewing surveillance system also make it possible to carry out the viewing surveillance without any restriction set to viewers or any burden to the broadcast stations. The image feature data generating unit 12 receives a picture signal from the image viewing terminal 50, and generates the image feature data which represents a feature of the image from the picture signal. The image information transmitting unit 13 transmits the image feature data generated by the image feature data generating unit 12 to the viewing surveillance server 2. On the other hand, the image feature data generating units 21a to 21c also generates the image feature data based on the broadcasted programs and stores the image feature data in the program image feature data storing unit 22. The viewing program specifying unit 23 specifies the viewed program by matching the image feature data received from the image information transmitting unit 13 and the image feature data stored in the program image feature data storing unit 22.

10 Claims, 9 Drawing Sheets

U.S. PATENT DOCUMENTS

| | | | | | |
|---|---|---|---|---|---|
| 4,876,736 | A | * | 10/1989 | Kiewit | 725/14 |
| 5,481,294 | A | * | 1/1996 | Thomas et al. | 725/20 |
| 2002/0133393 | A1 | | 9/2002 | Tatsumi et al. | |
| 2004/0013401 | A1 | | 1/2004 | Kasutani et al. | |

FOREIGN PATENT DOCUMENTS

| | | | |
|---|---|---|---|
| JP | 6-231254 | A | 8/1994 |
| JP | 7-327017 | A | 12/1995 |
| JP | 8-280075 | | 10/1996 |
| JP | 9-065299 | | 3/1997 |
| JP | 10-112829 | | 4/1998 |
| JP | 11-275607 | | 10/1999 |
| JP | 11-284584 | | 10/1999 |
| JP | 2000-068956 | A | 3/2000 |
| JP | 2000-307530 | A | 11/2000 |
| JP | 2000-358255 | A | 12/2000 |
| JP | 2001-069098 | A | 3/2001 |
| JP | 2001-177853 | A | 6/2001 |
| JP | 2001-298433 | A | 10/2001 |
| JP | 2002-010230 | A | 1/2002 |
| JP | 2002-058049 | A | 2/2002 |
| JP | 2002-077436 | A | 3/2002 |
| JP | 2002-135810 | A | 5/2002 |
| JP | 2002-142234 | A | 5/2002 |
| JP | 2002-271286 | A | 9/2002 |
| JP | 2002-300126 | A | 10/2002 |
| JP | 2002-305760 | A | 10/2002 |
| JP | 2002-335543 | A | 11/2002 |
| JP | 2002-344933 | A | 11/2002 |
| JP | 2003-502936 | A | 1/2003 |
| JP | 2003-179566 | A | 6/2003 |
| JP | 2005-020233 | A | 1/2005 |
| WO | WO 00/79709 | A1 | 12/2000 |

* cited by examiner

Fig. 3A
DCT CONVERTED RESULT OF Y COMPONENT

| $Y_1$ | $Y_2$ | $Y_6$ | | | | | |
|---|---|---|---|---|---|---|---|
| $Y_3$ | $Y_5$ | | | | | | |
| $Y_4$ | | | | | | | |
| | | | | | | | |
| | | | | | | | |
| | | | | | | | |
| | | | | | | | |
| | | | | | | | |

Fig. 3B
DCT CONVERTED RESULT OF Cb COMPONENT

| $Cb_1$ | $Cb_2$ | | | | | | |
|---|---|---|---|---|---|---|---|
| $Cb_3$ | | | | | | | |
| | | | | | | | |
| | | | | | | | |
| | | | | | | | |
| | | | | | | | |
| | | | | | | | |
| | | | | | | | |

Fig. 3C
DCT CONVERTED RESULT OF Cr COMPONENT

| $Cr_1$ | $Cr_2$ | | | | | | |
|---|---|---|---|---|---|---|---|
| $Cr_3$ | | | | | | | |
| | | | | | | | |
| | | | | | | | |
| | | | | | | | |
| | | | | | | | |
| | | | | | | | |
| | | | | | | | |

Fig. 4
SEARCH WINDOW HAVING CAPACITY SAME WITH THAT OF BUFFER
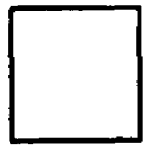
DISPLACING SEARCH WINDOW AND
COMPARING RESPECTIVE IMAGE FEATURE QUANTITY
→
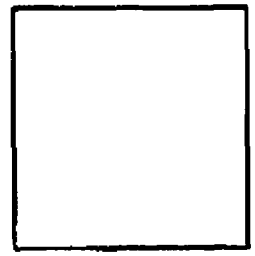 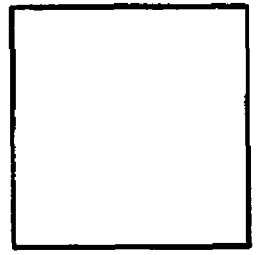 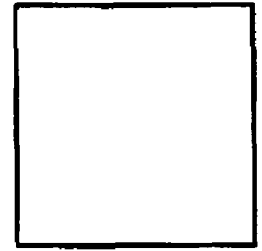 ......
BUFFERS CORRESPONDING TO RESPECTIVE CHANNELS

VIEWING SURVEILLANCE SYSTEM FOR CARRYING OUT SURVEILLANCE INDEPENDENT OF A BROADCASTING FORM

TECHNICAL FIELD

The present invention relates to a viewing surveillance system for surveying whether or not a broadcast program or the like is viewed, and more particularly relates to a viewing surveillance system for surveying whether or not a program broadcasted as an image is viewed.

BACKGROUND ART

Typically, the viewing surveillance of the broadcast program is carried out by a media sensor installed in a television receiver of a target household. The media sensor is the apparatus for specifying a channel viewed by a viewer by detecting the electric wave leaked from the television receiver.

Also, various systems for carrying out the viewing surveillances have been variously proposed. In the case of system described in Japanese Laid Open Patent Application JP-P 2002-135810A (in particular, paragraphs 0014 to 0017 and paragraphs 0030 to 0033, FIG. 2), the history of selected programs is accumulated in a sophisticated portable terminal by which the television receiver is controlled and then transmits the history from the sophisticated function portable terminal through an external network to a viewing rate surveillance company. Then, the viewing rate surveillance company carries out a viewing rate surveillance (viewing surveillance). In a system described in the patent document 1, a sophisticated portable terminal is embodied by integrating a portable telephone or a PHS (Personal Handyphone System) having a character image displaying apparatus, and a remote controller for operating a television receiver into a single unit. The system described in the patent document 1, by using the sophisticated portable terminal, can grasp the viewing frequency of programs, time, taste, tendency or the like of the individual viewers of the television broadcast.

In a system described in Japanese Laid Open Patent Application JP-P 2001-177853A (in particular, pages 4 to 6 and FIGS. 1 to 3), a television receiver used by a viewer preliminarily receives an image code (program identification code) to identify a viewing program from a tabulation machine. Then, the television receiver receives a broadcast program to which an image code of a program is added, and compares the image code added to the program with the image code preliminarily received from the tabulation machine. If the image codes are matched, the television receiver generates a viewing history of the program and transmits the viewing history to the tabulation machine. The tabulation machine integrates the viewing histories, generates a integrated data and manages this.

Also, In Yamada Akio, [MPEG-7 Visual Tutorial], Audio Visual Complex Information Processing Symposium 2001, Information Processing Society, pp. 45 to 54, [Color Layout] that is represented so as to be able to discriminating images and [Motion Activity] that is represented so as to be able to discriminating images in accordance with the intensity of motion in the image are introduced.

Japanese Laid Open Patent Application JP-P 2000-68956A discloses an individual viewing rate tabulation system, wherein a portable sound collector for modulating a carrier wave of a frequency assigned to an individual in accordance with the sound of a viewed program to which an individual identification signal of a surveillance target person is added and wirelessly transmitting to a viewed program collector is carried in a shape of a watch or tiepin by a plurality of surveillance target persons, and each time the viewed program collector, which analyzes the sounds received from the plurality of portable sound collectors, and extracts characteristic parameter matrix patterns indicative of the features of the sounds, and has a memory that can continuously record the characteristic parameter matrix patterns, the reception times and the individual identification signals of the surveillance target persons, is accessed by a program viewing rate collector tabulation center, the digital data with regard to the characteristic parameter matrix pattern, the reception signal and the individual identification signal of the surveillance target person is transmitted through a telephone modem installed in the view program collector and a telephone line to the program viewing rate tabulation center, and the individual viewing rate is consequently integrated, the individual viewing rate tabulation system being characterized in that the portable sound collector includes a microphone for collecting the sound into the view program and a transmitter for modulating the carrier wave of the frequency assigned to the individual in accordance with the sound signal from the microphone and a transmission signal in which the individual identification signal is multiplexed and transmitting, the view program collector includes: a reception separating circuit for receiving the transmitted sound signal from each of the portable sound collectors received by the plurality of surveillance target persons, demodulating the transmitted sound signal and separating the individual identification signal of the surveillance target person and the music sound signal viewed by each of the surveillance target persons, respectively; a plurality of characteristic parameter extracting circuits for performing an analog digital conversion on the sound signal outputted from the reception separating circuit, and disassembling into one or a plurality of frequency spectra through a digital filter, and extracting amplitude components of each frequency, and then outputting the digital data in which the time change in the amplitude level for each frequency spectrum is sampled at a certain interval, and consequently coping with the plurality of individuals; a data processing circuit that has a program memory for storing an output signal of the characteristic parameter extracting circuit, a time scale and the individual identification signal, a device for recording in turn the output signal of the characteristic parameter extracting circuit and the time scale in the program memory and generating the characteristic parameter matrix pattern of the sound based on the time distribution of the amplitude level and the frequency spectrum of the sound, a device for comparing the time signal received from the program viewing rate tabulation center and a time of a built-in clock and calibrating the time of the built-in clock if the mismatching is detected, a device for recording the individual identification signal of the surveillance target person outputted from the reception separating circuit in the program memory, and a device for transferring the characteristic parameter matrix pattern of the music sound, the individual identification signal of the surveillance target person, and a transferring start and end time signal to the telephone line while adjusting a transfer speed; and a telephone modem for transferring the characteristic parameter matrix pattern of the sound, the individual identification signal of the surveillance target person, and the transferring start and end time signal to the telephone line and receiving the time signal from the program viewing rate tabulation center, and the program viewing rate tabulation center compares the digital data of the characteristic parameter matrix patterns transferred from the plurality of viewed program collectors, the individual identification signals of the surveillance target persons, and the transferring start and end times and the characteristic parameter matrix pattern extracted from the sound at the reception time from the recording of the program of an surveillance target broadcasting station while correcting the difference between the reception time of the viewed program collector and the reception time of the surveillance target broadcasting station, and then specifies the viewed program and consequently integrates the individual viewing rates of the program.

Japanese Laid Open Patent Application JP-P 2000-307530A discloses a wearable viewing rate meter system provided with broadcast receivers of surveillance targets, wearable viewing rate meters, public wireless base stations in a mobile communication network, a telephone network and a viewing rate tabulation center, the wearable viewing rate meter system being characterized by being provided with: the wearable viewing rate meter which has a function for collecting a sound of a viewed program of a surveillance target person from a built-in microphone, extracting a characteristic parameter of the sound, and transferring a propagation packet where a set of a viewed program sound data constituted by the characteristic parameter, a view time, an identification code of the surveillance target person and a transfer time is multiplexed, and can be always possessed by the surveillance target person; the public wireless base station of the mobile communication network which has a function for adding a base station identification code to the propagation code; and the viewing rate tabulation center which has a function for receiving the propagation packet through the telephone network from the public wireless base station, a function for receiving all broadcast programs (hereafter, referred to as standard programs) that can be received at a view time in a view territory, a function for extracting the characteristic parameter of the sound of the standard program and generating a standard program packet where one set of a broadcast territory, a program name and a broadcast time are multiplexed for the standard program sound data constituted by the characteristic parameter, and a function for sequentially selecting the standard program packets in accordance with the base station identification code and the view time separated from the propagation packet, and determining a relative relation between the characteristic parameter included in the packet and the characteristic parameter included in the propagation packet, and specifying the program in accordance with this relative work.

Japanese Laid Open Patent Application JP-P 2000-358255A discloses an interactive television broadcast system, characterized in that the interactive television broadcast system has: a supply source apparatus for supplying programs of a plurality of television programs and data through a broadcast; and a plurality of receiving apparatuses each having a selecting device for carrying out a channel selection to receive one television channel from television channels transmitted by the supply source apparatus, a processing device for judging the channel received by the receiving apparatus in response to the data transmitted from the supply source apparatus, and a transmitting unit for transmitting the information related to the channel being received by the receiving apparatus to a data collecting apparatus which is commonly installed.

Japanese Laid Open Patent Application JP-P 2001-69098A discloses a data broadcasting method which broadcasts a data broadcast program composed of a plurality of pages in such a way that one page of them can be selected by a receiving person side, and the receiving person side can receive the provision of information for each selection instruction page, the data broadcasting method being characterized in that a broadcasting apparatus for broadcasting the data broadcast program broadcasts a control information to control a receiving apparatus for receiving the data broadcast program by including it in a broadcast signal of the data broadcast program so that the receiving person side replies the information as to which of pages is selected, and the receiving apparatus for receiving the data broadcast program replies the information as to which of the pages is selected by the receiving person side, through a predetermined communication path to the broadcasting apparatus, in response to the control information included in the broadcast signal of the data broadcast program.

Japanese Laid Open Patent Application JP-P 2001-298433A discloses a viewing rate surveillance apparatus that is an apparatus set in a home so as to transmit a data with regard to a broadcast program viewed in the home as a viewing surveillance data, and includes: a receiving device for receiving an extracted data whose data amount is reduced by using a specifying algorithm from a broadcast output data of each broadcast station; a received extracted data storing device for accumulating the received extracted data; a broadcast data storing device for recording the broadcast output data actually being viewed in the broadcast receiver; a determining device for comparing the extracted data and the broadcast output data and determining the viewed broadcast station; and a transmitting unit for transmitting the determined station as the already viewed data to the viewing rate surveillance center.

Japanese Laid Open Patent Application JP-P 2002-10230A discloses an image delivering method for extracting a characteristic value for a subject in an image and delivering the characteristic value and the image through a network, the image delivering method being characterized in that a user edits a delivery request of an image content and the characteristic value of the image content to a center, and the center extracts the image content corresponding to the delivery request, from an image archive storing the image content composed of particular items including the information of the kind of the image, and also extracts the characteristic value corresponding to the image content from a characteristic value storing device, and then delivers to the user of the edition source of the delivery request.

Japanese Laid Open Patent Application JP-P 2002-58049A discloses a broadcast checking apparatus for checking a broadcast of a content including an image, the broadcast checking apparatus being characterized by including: an accumulating device for accumulating a characteristic value of the content; a content characteristic value extracting device for extracting the characteristic value of the content from a broadcast signal; a content registering device for registering the characteristic value of the content extracted by the content characteristic value extracting device in the accumulating device, a first characteristic value calculating device for calculating the characteristic value from the broadcast signal; a comparing device for comparing the characteristic value calculated by the first characteristic value calculating device and the characteristic value on the accumulating device; and a recording device for recording the comparison result obtained from the comparison.

Japanese Laid Open Patent Application JP-P 2002-77436A discloses a television viewing rate surveillance method, characterized by including: a remote commander for controlling a television receiver; a time measuring device, a storing device; a data storing device which, if there is an on/off operation of a power source of the television receiver and a channel selection operation between the on/off, stores a time data of the time measuring device at each operation point as for the on/off operation, and the operation time data as for the channel separation operation and the selected channel data, in the storing device, respectively; a data transmitting unit in a PHS (personal handy-phone system) telephone or a portable telephone; and a transmission control device which, each time the time measuring device measures a predetermined time, instructs the data transmitting unit to transmit a preliminarily given terminal identification data and the data stored in the storing device to a mail address of a data tabulation center prepared for a mail server on a network of the PHS telephone or the portable telephone, wherein the remote commander is lent to the predetermined number of television possession homes serving as monitors, and the data tabulation center side accesses a mail box of the mail address periodically or at a desirable time and then collects and processes the data and consequently determines a household viewing rate of the television.

Japanese Laid Open Patent Application JP-P 2002-142234A discloses a receiving apparatus that can totalize a viewing rate or hearing rate of a broadcast, characterized by at least including: a separating device of a content information for separating and extracting the content information to specify what is at least the content, from the content sent synchronously with the broadcasted content; a data generating device, which correspondingly to the content during reception, generates the extracted content information, a station information to specify a broadcast station broadcasting the content, a time information to specify a time when the content is received, as the data to totalize the viewing rate or hearing rate; and a data accumulating device for accumulating the data generated by the data generating device.

Japanese Laid Open Patent Application JP-P 2002-271286A discloses a viewing data collecting system of a digital broadcast, wherein in a digital data broadcast system provided with: a digital broadcast station for carrying out a data broadcast service; a non-volatile storing portion for storing a data; a communication line interface, a digital data broadcast receiver having a central operation processor for receiving a data broadcast program data transmitted from a broadcast station and interpreting it and generating a data broadcast screen; and a center server for receiving the data transmitted from this receiver, as necessary, through a communication line network and managing a database to totalize them, since the receiver includes a viewing surveillance executing device for recording an identification information of a viewing broadcast station or viewing program together with a time at that time at a certain time interval in the non-volatile storing portion, and transferring the data recorded in the non-volatile storing portion at the larger certain time interval through the communication line interface to the center server, the data broadcast enabling the collection of the viewing surveillance data is used.

Japanese Laid Open Patent Application JP-P 2002-300126A discloses a data collecting system in which a data collection managing dealer affiliates with a mobile body manager and collects a collection data including a program viewing data of a mobile body broadcast in each mobile body, the data collecting system being characterized by including: a receiving apparatus which is installed in the mobile body managed by the mobile body manager and collects and accumulates the viewing data of the mobile body broadcast; a data relaying apparatus which is installed in a mobile body managing facility managed by the mobile body manager and receives the accumulated collection data from the receiving apparatus of the mobile body and transmits to a data totalizing destination; and a data totalizing apparatus which is installed in a data totalizing station managed by the data collection managing dealer and receives the collection data transmitted from the data relaying apparatus and carries out a predetermined totalization and analysis.

Japanese Laid Open Patent Application JP-P 2002-305760A discloses a viewing history information collecting system, characterized by including: a program broadcasting device for broadcasting a program; an operating device; a program accumulating and reproducing device for accumulating and reproducing the program received from the program broadcasting device, in response to an operation of the operating device; a history information collecting device for collecting a viewing history information of the program accumulated in the program accumulating and reproducing device including an operation history information of the operating device; a transmitting unit for transmitting the viewing history information collected by the history information collecting device through a communication path; and a history information storing device for storing the viewing history information received from the transmitting unit through the communication path.

Japanese Laid Open Patent Application JP-P 2002-335543A discloses a viewing state surveillance method, characterized by including; a step of receiving a broadcast stream containing a viewing state data obtainment script; a step of executing the viewing state data obtainment script; and a step of transmitting the obtained viewing state data to a center computer, wherein the executing step checks whether or not a member identification information indicative of a monitor member is stored in a predetermined region, and obtains the viewing state data only if the member identification information is stored.

Japanese Laid Open Patent Application JP-P 2002-344933A discloses a viewing information collecting system that includes: a broadcasting facility for generating a program data composed of an image information of a program and a voice information, and a predetermined program addition information related to the program, and using a data broadcast and then broadcasting the program addition information together with the program data; a plurality of broadcast receiving terminals for receiving the program data corresponding to the program selected by a viewer and the program addition information, and automatically generating and transmitting the viewing information where a program reception information to specify a reception program extracted from the program addition information and a viewer information with regard to the viewer are combined; and a viewing information server for receiving the viewing information transmitted from the plurality of broadcast receiving terminals, respectively, and generating a marketing information on which a desirable analyzing/treating process is performed for each program provider in accordance with the respective viewing information and then transmitting to the program provider.

Japanese Laid Open Patent Application JP-A-Heisei, 08-280075 discloses an infrared ray remote control signal information detecting apparatus for detecting an infrared ray remote control signal emitted to operate a surveillance target sample having a light receiving portion for receiving the infrared ray remote control signal, the infrared ray remote control signal information detecting apparatus being characterized by having an infrared ray emitting portion which is placed so as to cover the light receiving portion of the surveillance target sample and transmits an infrared ray signal corresponding to the infrared ray remote control signal detected by the infrared ray remote control signal information inspecting apparatus, to the light receiving portion of the surveillance target sample.

Japanese Laid Open Patent Application JP-A-Heisei, 09-065299 discloses a receiving apparatus characterized by including: a program signal receiving device for receiving a program signal to which a program identification information is added; a program identification information separating device for separating the program identification information from the program signal received by the program signal receiving device; and a first information storing device for storing the program identification information separated by the program identification information separating device.

Japanese Laid Open Patent Application JP-A-Heisei, 10-112829 discloses an image broadcasting system in which a broadcast station side transmits a picture signal through an electric wave or cable to a receiver side of a viewer, the image broadcasting system being characterized in that the broadcast station includes a device for inserting a scrambled or encrypted subliminal picture signal into the picture signal, and the receiver side includes: a device for extracting the scrambled or encrypted subliminal image from the received picture signal; a device for decoding the extracted scrambled or encrypted subliminal image under condition that an allowance signal is inputted; a device for synthesizing the decoded subliminal image with front and rear images and displaying; and a device for inputting the allowance signal.

Japanese Laid Open Patent Application JP-A-Heisei, 11-275607 discloses a television viewing rate surveillance system, characterized by having: an infrared ray receiving device for receiving an infrared ray signal emitted by an infrared ray remote controller; an operation judging device which, when the infrared ray remote controller is operated, analyzes the infrared ray signal received by the infrared ray receiving device in accordance with a pre-stored predetermined format and judges a television operation content; a program viewing information storing device for storing a program viewing information generated correspondingly to the judged result by the operation judging device; and a communication control device which is connected an existing communication system and transmits the program viewing information stored in the program viewing information storing device, in response to a request, through the existing communication system to a center apparatus side.

Japanese Laid Open Patent Application JP-A-Heisei, 11-284584 discloses a program selection history information obtaining apparatus for obtaining a selection history information of a program selected from programs of a plurality of channels, the program selection history information obtaining apparatus being characterized by including: a storing device for storing the selection information of the program at a predetermined obtaining timing; and a transmitting unit for transmitting the selection history information composed of the plurality of selection information stored for each of the plurality of obtaining timings to a predetermined report destination at a predetermined timing that is peculiarly assigned.

Japanese Laid Open Patent Application JP-P 2003-502936A discloses a viewing rate surveillance system, the system being composed of: (A) a plurality of portable monitoring units assigned to users who are target persons of a viewing rate panel, where each of the portable monitoring units records an information indicating a free sound field sound signal received by the portable monitoring unit, and the information indicating the free sound field sound signal contains an information indicating a content of the free sound field sound signal and a time stamp information indicating a time when the free sound field sound signal is received by the portable monitoring unit; (B) a central broadcast collecting facility for recording the information indicating sound signals propagated from a plurality of sound sources, where with regard to each sound signal, the information recorded by the central broadcast collecting facility contains the information indicating the content of the sound signal, the time stamp information indicating the time when the sound signal is received by the central broadcast collecting facility, and the sound source information indicating the sound source propagating the sound signal; and (C) a computer for identifying the sound source selected by each user of the portable monitoring unit between a plurality of time intervals different from each other, in accordance with the information recorded by the portable monitoring unit and the information recorded by the central broadcast collecting facility.

DISCLOSURE OF INVENTION

Problems to be Solved by the Invention

The method of detecting the electric wave leaked from the television receiver by a media sensor cannot be applied to the television receiver, in which there is no leakage of the electric wave, such as a digital television and the like. In a digital broadcast and the like, there is a case where a plurality of contents are included in the same frequency band, and there is also a problem where the content viewed by the viewer cannot be specified.

Also, the system described in the patent document 1 has the problem that the accurate viewing surveillance could not be executed, unless the particular terminal (a sophisticated portable terminal) was used to operate the television receiver when the program was viewed. For example, when the operation for changing the channel was carried out by using a channel change button placed on the television receiver without using the sophisticated portable terminal, the viewing history was not accumulated in the sophisticated portable terminal, and the accurate viewing surveillance could not be executed.

Also, in the system described in the patent document 2, all of the broadcast stations targeted for the viewing surveillance are required to add the image codes (program identification codes) to the respective broadcast programs. As a result, the broadcast station has the burden on the operation of the inevitable introduction of the apparatus for adding the image code to the broadcast program, and the like.

It is therefore an object of the present invention to provide the viewing surveillance system that can carry out the viewing surveillance, independently of the broadcast type, such as an analog broadcast, a digital broadcast or the like. Another object is to provide the viewing surveillance system that can carry out the viewing surveillance without setting the limitation, in which the viewer must use a special terminal, and the like. Still another object is to provide the viewing surveillance system that can reduce the burden on the broadcast station, in which the image code must be added to the program.

BRIEF DESCRIPTION OF THE DRAWINGS

FIG. 3A is the explanation view showing the example of the DCT conversion result for the Y component.

FIG. 3B is tle explanation view showing the example of the DCT conversion result for the Cb component.

FIG. 3C is tie explanation view showing the example of the DCT conversion result for the Cr component.

FIG. 4 is the explanation view showing the concept of the state when the viewing program specifying unit compares the image feature data.

BEST MODE FOR CARRYING OUT THE INVENTION

Figure 1:
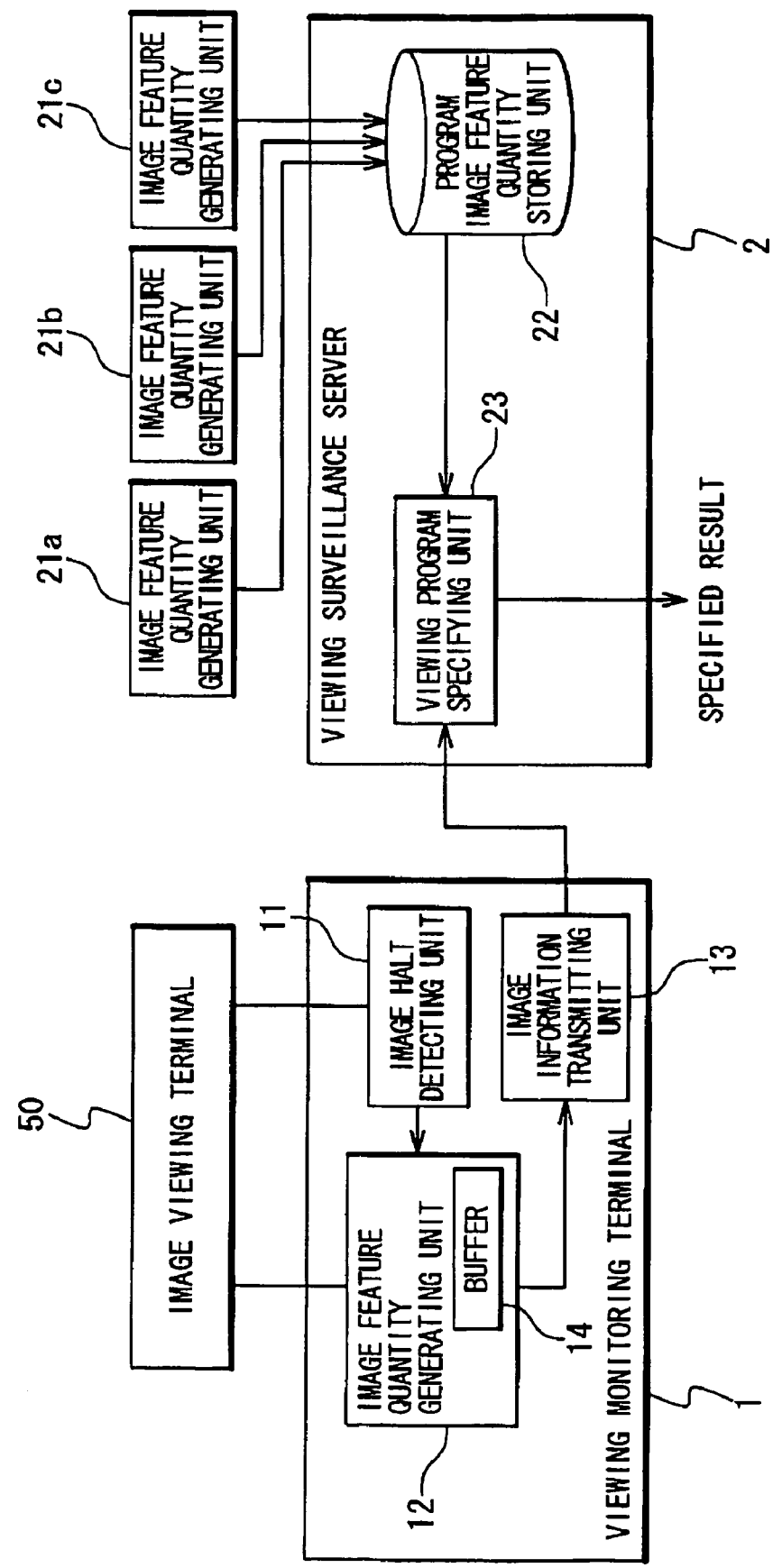
FIG. 1 is the block diagram showing the configuration in the first embodiment of the present invention.

A viewing surveillance system according to the present invention includes: a picture signal input unit to which a picture signal of an image is inputted from a graphic displaying terminal for displaying an image of a program to be broadcasted; an image feature data generating unit for generating an image feature data, which is the information indicating the feature of the image, based on the picture signal inputted to the picture signal input unit; a program image feature data generating unit for generating the image feature data of the image of the program for each channel based on the picture signal of the program that is broadcasted in each channel; a program image feature data storing unit for storing the image feature data generated by the program image feature data generating unit; and a viewing program specifying unit for estimating the degree of similarity between the image feature data generated by the image feature data generating unit and each image feature data stored by the program image feature data storing unit and consequently specifying the program displayed on the graphic displaying terminal or the channel broadcasting the program.

A viewing surveillance system according to the present invention includes: a viewing surveillance terminal installed in the graphic displaying terminal for displaying the image of the program to be broadcasted; a viewing surveillance server connected to the viewing surveillance terminal; and the program image feature data generating unit for generating the image feature data, which is the information indicating the feature of the image, for each program of each channel based on the picture signal of the program broadcasted in each channel. The viewing surveillance terminal includes: the picture signal input unit to which the picture signal of the image displayed by the graphic displaying terminal is inputted from the graphic displaying terminal; the image feature data generating unit for generating the image feature data, which is the information indicating the feature of the image displayed by the graphic displaying terminal based on the picture signal inputted to the picture signal input unit; and a transmitting unit for transmitting the image feature data generated by the image feature data generating unit to the viewing surveillance server. The viewing surveillance server includes: the program image feature data storing unit for storing the image feature data generated by the program image feature data generating unit; and the viewing program specifying unit for estimating the degree of similarity between the image feature data transmitted by the transmitting unit and each image feature data stored by the program image feature data storing unit and consequently specifying the program displayed by the graphic displaying terminal or the channel broadcasting the program.

The viewing surveillance terminal includes a power source state judging unit for judging whether the power source of the graphic displaying terminal is on or off. The image feature data generating unit may be configured so as to generate the image feature data of the image displayed by the graphic displaying terminal, if the power source of the graphic displaying terminal is judged to be on.

The transmitting unit transmits the information of the time when the picture signal is inputted to the picture signal input unit from the graphic displaying terminal, together with the image feature data generated in accordance with the picture signal, to the viewing surveillance server. The program image feature data generating unit stores the information of the time when the picture signal of the program is received, together with the image feature data generated in accordance with the picture signal, in the program image feature data storing unit. The viewing surveillance server may be configured so as to further include a first degree of similarity estimation process target restriction unit for determining an estimation process target of the degree of similarity by the viewing program specifying unit, in accordance with the information of the time received from the transmitting unit and the information of the time stored by the program image feature data storing unit.

The program image feature data storing unit stores the image feature data generated by the program image feature data generating unit for each channel. The transmitting unit transmits a position information indicating the position of the graphic displaying terminal, together with the image feature data, to the viewing surveillance server. The viewing surveillance server may be configured so as to further include: a channel information storing unit for storing a list information of channels that can be received at respective positions; and a second degree of similarity estimation process target restriction unit for specifying the channel that can be received by the graphic displaying terminal, in accordance with the position information of the graphic displaying terminal received from the transmitting unit and the list information and consequently determining the estimation process target of the degree of similarity by the viewing program specifying unit.

Also, the viewing surveillance terminal according to the present invention includes: the picture signal input unit to which the picture signal of the image is inputted from the graphic displaying terminal for displaying the image of the program to be broadcasted; the image feature data generating unit for generating the image feature data that is the information indicating the feature of the image displayed by the graphic displaying terminal, in accordance with the picture signal inputted to the picture signal input unit; and the transmitting unit for transmitting the image feature data generated by the image feature data generating unit to the viewing surveillance server for specifying the program corresponding to the image or the channel broadcasting the program, in accordance with the image feature data.

The power source state judging unit for judging whether the power source of the graphic displaying terminal is on or off is included. The image feature data generating unit may be configured so as to generate the image feature data of the image displayed by the graphic displaying terminal, if the power source of the graphic displaying terminal is judged to be on.

The transmitting unit may be configured so as to transmit the information of the time when the picture signal is inputted to the picture signal input unit from the graphic displaying terminal, together with the image feature data generated in accordance with the picture signal, to the viewing surveillance server.

The transmitting unit may be configured so as to transmit the position information indicating the position of the graphic displaying terminal, together with the image feature data generated in accordance with the picture signal, to the viewing surveillance server.

Also, the viewing surveillance server according to the present invention includes: the program image feature data generating unit for generating the image feature data, which is the information indicating the feature of the image, for each program of each channel, in accordance with the picture signal of the program broadcasted in each channel; the program image feature data storing unit for storing the image feature data generated by the program image feature data generating unit; and the viewing program specifying unit for receiving the image feature data, which is the information indicating the feature of the image displayed by the graphic displaying terminal, from the viewing surveillance terminal placed in the graphic displaying terminal for displaying the image of the program to be displayed, and estimating the degree of similarity between the received image feature data and each image feature data stored by the program image feature data storing unit, and consequently specifying the program displayed by the graphic displaying terminal or the channel broadcasting the program.

The program image feature data storing unit may be configured so as to: store the information of the time when the program image feature data generating unit receives the picture signal of the program, together with the image feature data generated in accordance with the picture signal; receive the information of the time when the graphic displaying terminal receives the picture signal, and the image feature data generated in accordance with the picture signal, from the viewing surveillance terminal; and include the first degree of similarity estimation process target restriction unit for determining the estimation process target of the degree of similarity by the viewing program specifying unit, in accordance with the information of the reception time and the information of the time stored by the program image feature data storing unit.

The program image feature data storing unit may be configured so as to include: the channel information storing unit for storing the image feature data generated by the program image feature data generating unit for each channel and storing the list information of the channels that can be received at the respective positions; and the second degree of similarity estimation process target restriction unit for receiving the position information of the graphic displaying terminal from the viewing surveillance terminal and specifying the channel that can be received by the graphic displaying terminal, in accordance with the position information of the graphic displaying terminal and the list information, and consequently determining the estimation process target of the degree of similarity by the viewing program specifying unit.

Also, the viewing surveillance system according to the present invention includes: the viewing surveillance terminal placed in the graphic displaying terminal for displaying the image of the program to be broadcasted; the viewing surveillance server connected to the viewing surveillance terminal; and the program image feature data generating unit for generating the image feature data, which is the information indicating the feature of the image, for each program of each channel, in accordance with the picture signal of the program broadcasted in each channel. The viewing surveillance terminal includes an image transmitting unit for transmitting the picture signal of the image displayed by the graphic displaying terminal, to the viewing surveillance server. The viewing surveillance server includes: the image feature data generating unit for generating the image feature data of the image displayed by the graphic displaying terminal, in accordance with the picture signal transmitted from the image transmitting unit; the program image feature data storing unit for storing the image feature data generated by the program image feature data generating unit; and the viewing program specifying unit for estimating the degree of similarity between the image feature data generated by the program image feature data generating unit and each image feature data stored by the program image feature data storing unit and consequently specifying the program displayed by the graphic displaying terminal or the channel broadcasting the program.

The viewing surveillance terminal includes the power source state judging unit for judging whether the power source of the graphic displaying terminal is on or off. The image transmitting unit may be configured so as to transmit the picture signal of the image displayed by the graphic displaying terminal to the viewing surveillance server, if the power source of the graphic displaying terminal is judged to be on.

The image transmitting unit transmits the information of the time when the picture signal is inputted from the graphic displaying terminal, together with the picture signal of the image displayed by the graphic displaying terminal, to the viewing surveillance server. The program image feature data generating unit stores the information of the time when the picture signal of the program is received, together with the image feature data generated in accordance with the picture signal, in the program image feature data storing unit. The viewing surveillance server may be configured so as to include the first degree of similarity estimation process target restriction unit for determining the estimation process target of the degree of similarity by the viewing program specifying unit, in accordance with the information of the time received from the image transmitting unit and the information of the time stored by the program image feature data storing unit.

The viewing surveillance terminal includes the position information transmitting unit for transmitting the position information indicating the position of the graphic displaying terminal to the viewing surveillance server. The program image feature data storing unit stores the image feature data generated by the program image feature data generating unit for each channel. The viewing surveillance server may be configured so as to include: the channel information storing unit for storing the list information of the channels that can be received at the respective positions; and the second degree of similarity estimation process target restriction unit for specifying the channel that can be received by the graphic displaying terminal, in accordance with the position information received from the position information transmitting unit and the list information and consequently determining the estimation process target of the degree of similarity by the viewing program specifying unit.

Also, the viewing surveillance terminal according to the present invention includes: the power source state judging unit for judging whether the power source of the graphic displaying terminal for displaying the program is on or off; and the image transmitting unit for transmitting the picture signal of the image displayed by the graphic displaying terminal, if the power source of the graphic displaying terminal is judged to be on, to the viewing surveillance server for specifying the program corresponding to the image or the channel broadcasting the program, in accordance with the image feature data which is the information indicating the feature of the image.

Also, the viewing surveillance server according to the present invention includes: the image feature data generating unit for receiving the picture signal of the image displayed by the graphic displaying terminal for displaying the image of the program to be broadcasted, from the viewing surveillance terminal placed in the graphic displaying terminal, and generating the image feature data which is the information indicating the feature of the image displayed by the graphic displaying terminal, in accordance with the picture signal; the program image feature data generating unit for generating the image feature data, which is the information indicating the feature of the image, for each program of each channel; the program image feature data storing unit for storing the image feature data generated by the program image feature data generating unit; and the viewing program specifying unit for estimating the degree of similarity between the image feature data generated by the image feature data generating unit and each image feature data stored by the program image feature data storing unit, and consequently specifying the program displayed by the graphic displaying terminal or the channel broadcasting the program.

The program image feature data storing unit may be configured so as to include the first degree of similarity estimation process target restriction unit that stores the information of the time when the program image feature data generating unit receives the picture signal of the program, together with the image feature data generated by the program image feature data generating unit, and receives the information of the time when the picture signal of the image displayed by the graphic displaying terminal is transmitted from the graphic displaying terminal to the viewing surveillance terminal, and then determines the estimation process target of the degree of similarity by the viewing program specifying unit, in accordance with the information of the reception time and the information of the time stored by the program image feature data storing unit.

The program image feature data storing unit may be configured so as to include: the channel information storing unit for storing the image feature data generated by the program image feature data generating unit for each channel and storing the list information of the channels that can be received at the respective positions; and the second degree of similarity estimation process target restriction unit that receives the position information of the graphic displaying terminal from the viewing surveillance terminal, and specifies the channel that can be received by the graphic displaying terminal, in accordance with the position information of the graphic displaying terminal and the list information, and consequently determines the estimation process target of the degree of similarity by the viewing program specifying unit.

Also, the viewing surveillance terminal according to the present invention includes: the picture signal input unit to which the picture signal of the image of the program is inputted from the graphic displaying terminal for displaying the image of the program to be broadcasted; the image feature data generating unit for generating the image feature data, which is the information indicating the feature of the image, in accordance with the picture signal inputted to the picture signal input unit; the program image feature data generating unit for generating the image feature data of the image of the program, for each channel, in accordance with the picture signal of the program broadcasted in each channel; the program image feature data storing unit for storing the image feature data generated by the program image feature data generating unit; and the viewing program specifying unit for estimating the degree of similarity between the image feature data generated by the image feature data generating unit and each image feature data stored by the program image feature data storing unit and consequently specifying the program displayed by the graphic displaying terminal or the channel broadcasting the program.

The power source state detecting unit for estimating whether the power source of the graphic displaying terminal is on or off is included, and the image feature data generating unit may be configured so as to generate the image feature data of the image displayed by the graphic displaying terminal, if the power source of the graphic displaying terminal is judged to be on.

The program image feature data generating unit may be configured so as to include the degree of similarity estimation process target restriction unit, which stores the information of the time when the picture signal of the program is received, together with the image feature data generated in accordance with the picture signal, in the program image feature data storing unit, and then determines the estimation process target of the degree of similarity by the viewing program specifying unit, in accordance with the time when the picture signal is inputted from the graphic displaying terminal to the picture signal input unit and the information of the time stored by the program image feature data storing unit.

Effect of the Invention

According to the present invention, the image feature data calculated from the program viewed by the viewer and the image feature data calculated from each program are compared to carry out the viewing surveillance. Since the image feature data based on the image as mentioned above is used to carry out the comparison, the viewing surveillance can be carried out, independently of the broadcast type such as the analog broadcast, the digital broadcast or the like. Also, there is no limitation on the viewer, in which the viewer must use the high function portable terminal and the like. Also, since each broadcast station does not need to add the image code to the program, the operational burden on each broadcast station can be reduced.

Also, when the power source of the image displaying apparatus is on, this is configured so as to calculate the image feature data or output the picture signal. Thus, only while the viewer keeps the power source of the image displaying apparatus on, the viewing surveillance can be efficiently executed.

Moreover, if the power source of the graphic displaying terminal is on, the image feature data of the image of the image displaying apparatus is generated, and the program image feature data generating unit generates the image feature data of the image of the program in accordance with the picture signal of the program broadcasted in each channel. Thus, the channel and program viewed by the viewer can be specified in substantial real time. As a result, the broadcast station can quickly carry out the consideration of the program organization.

Also, the time when the picture signal is inputted from the graphic displaying terminal to the picture signal input unit and the time when the program is actually broadcasted are referred to carry out the viewing surveillance. Thus, even if the timing when the electric wave of the broadcast reaches the viewer is slightly out, the viewing surveillance can be executed. Also, in the case when the viewer views, for example, the recorded program without viewing the program currently being broadcasted, or in other cases, the program viewed by the viewer can be specified.

Also, by referring to the position information of the graphic displaying terminal, it is possible to reduce the load on the estimating process for the degree of similarity, without any drop in the estimation precision of the degree of similarity at the time of the viewing surveillance.

BEST MODE FOR CARRYING OUT THE INVENTION

The best mode for carrying out the present invention will be described below with reference to the drawings.

First Embodiment

FIG. 1 shows a block diagram showing the configuration of the first embodiment of the present invention. The viewing surveillance system in this embodiment includes a viewing program monitoring terminal (hereafter, noted as a viewing monitoring terminal 1) and a viewing surveillance server 2.

The viewing monitoring terminal 1 is set up to an image viewing terminal 50. The image viewing terminal 50 is the terminal for displaying the image of broadcast programs or the reproduction image of recorded programs to a viewer. For example, the television receiver corresponds to the image viewing terminal 50. The viewing monitoring terminal 1 has an image halt detecting unit 11, an image feature data generating unit 12 and an image information transmitting unit 13. The image halt detecting unit 11 detects the state of the power source of the image viewing terminal 50 and outputs the state which shows whether the power source of the image viewing terminal 50 is on or off, to the image feature data generating unit 12.

A picture signal is inputted from the image viewing terminal 50 to the image feature data generating unit 12. Then, the image feature data generating unit 12 calculates the information (hereafter, referred to as the image feature data) indicating the feature of the image. An example of the calculating method of the image feature data in the image feature data generating unit 12 will be described later.

When the picture signal is inputted from the image viewing terminal 50 to the image feature data generating unit 12, the picture signal outputted from an image output terminal of the image viewing terminal 50 may be inputted to the image feature data generating unit 12. Also, the signal inputted to the image feature data generating unit 12 may be an analog signal or digital signal. As the output terminal of the analog picture signal placed at the image viewing terminal 50 such as the television receiver or the like, for example, there are a composite terminal, an S terminal, a component terminal, a D terminal and the like. The picture signal may be inputted from those terminals to the image feature data generating unit 12. Also, the picture signal may not be inputted from the output terminal of the picture signal to the image feature data generating unit 12. The image displayed by the image viewing terminal 50 may be photographed by a camera or the like, and the photographed result may be inputted.

Also, when a digital signal is inputted, a bit stream itself of the image being broadcasted may be inputted to the image feature data generating unit 12 from the image viewing terminal 50.

Also, in the example shown in FIG. 1, the image viewing apparatus 50 is indicated as one apparatus. However, there is also the case of the separation into a display apparatus for displaying an image and a tuner apparatus for receiving a broadcast. In this case, the image halt detecting unit 11 may detect the power source state of the display apparatus, and the picture signal may be inputted to the image feature data generating unit 12 from the tuner apparatus.

The image feature data generating unit 12 has a buffer 14 for storing the image feature data calculated from the input picture signal. The image information transmitting unit 13 is the interface unit for transmitting the information to the viewing surveillance server 2, and transmits the image feature data stored in the buffer 14 to the viewing surveillance server 2, when there becomes no free space in the buffer 14.

The viewing surveillance server 2 will be described below. The viewing surveillance server 2 has a program image feature data storing unit 22 and a viewing program specifying unit 23. The program image feature data storing unit 22 stores the image feature data generated from the image of the program of each channel being broadcasted. The program image feature data storing unit 22 stores the image feature data for each of the respective programs of the respective broadcast stations targeted for the viewing surveillance. The program image feature data storing unit 22 may store and accumulate the image feature data of each program, as described below. For example, correspondingly to each broadcast (each channel) to which a particular frequency is assigned to each, image feature data generating units 21a to 21c are installed, and the picture signals of the channels corresponding to the image feature data generating units 21a to 21c are inputted. Then, each of the image feature data generating units 21a to 21c generates the image feature data similarly to the image feature data generating unit 12 of the viewing monitoring terminal 1. Each of the image feature data generating units 21a to 21c stores the generated image feature data in the program image feature data storing unit 22. In addition, the image feature data generating units 21a to 21c may be installed in the viewing surveillance server 2, or may be installed at positions different from each other, and may be configured so as to upload the generated image feature data to the program image feature data storing unit 22.

Also, the program image feature data storing unit 22 has the buffer for each channel and stores the image feature data transmitted from the image feature data generating units 21a to 21c in the buffers corresponding to each of them. The capacity of the buffer corresponding to one channel in the program image feature data storing unit 22 is equal to or larger than the capacity of the buffer 14 installed in the viewing monitoring terminal 1.

Also, FIG. 1 shows the three image feature data generating units 21a to 21c. However, the number of program image feature data generating units is not limited to three, since they are installed correspondingly to the respective broadcast stations (the respective channels).

The viewing program specifying unit 23 compares the image feature data received from the image information transmitting unit 13 of the viewing monitoring terminal 1 and the image feature data stored by the program image feature data storing unit 22 and specifies the program viewed by the viewer. By specifying the program, the channel selected by the viewer can be specified. The viewing program specifying unit 23 outputs the specified result (the information of the program and channel which are viewed by the viewer). For example, it is outputted to a terminal (not shown) of a manager who carries out the viewing surveillance.

In the above-mentioned configuration, the image feature data generating units 12, 21a to 21c and the viewing program specifying unit 23 are attained, for example, by using CPU operated in accordance with a program. In this case, the program is stored in advance in ROM and the like, which are installed in the CPU.

Figure 2:
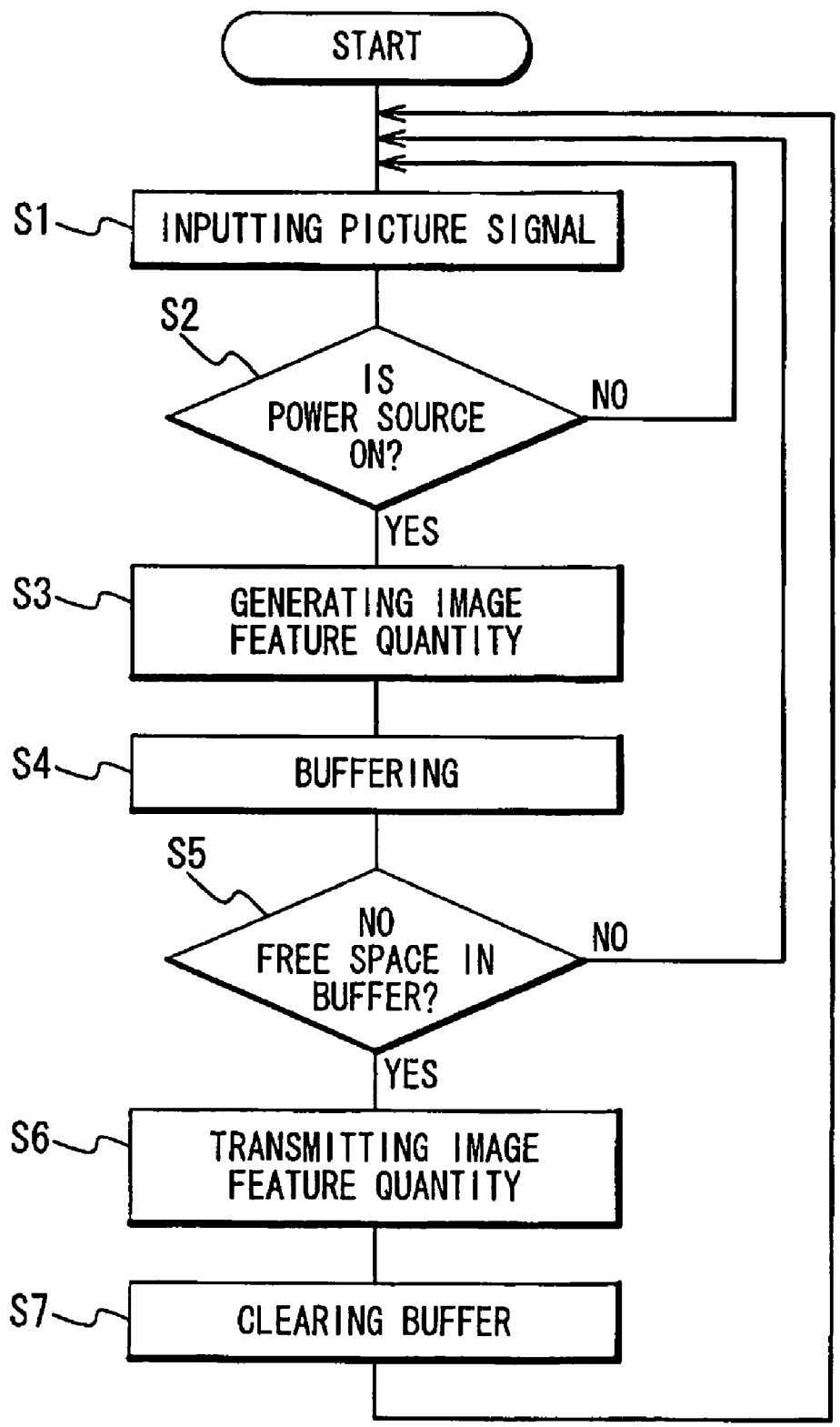
FIG. 2 is the flowchart showing the process progress of the viewing monitoring terminal in the first embodiment.

Next, the operation will be described. FIG. 2 is a flowchart showing an example of a process progress of the viewing monitoring terminal 1 in this embodiment. The image feature data generating unit 12 sequentially receives the picture signal from the image viewing terminal 50 (Step S1). Also, the image halt detecting unit 11 detects the power source state of the image viewing terminal 50 and reports the detected result to the image feature data generating unit 12. The image feature data generating unit 12 judges whether or not the power source of the image viewing terminal 50 is on in accordance with this report (Step S2), and returns to the step S1 if the power source of the image viewing terminal 50 is off.

Here, if the power source of the image viewing terminal 50 is off, the picture signal is not inputted from the image viewing terminal 50 to the image feature data generating unit 12 generally. However, even if the state is judged as No at the step S2, there is the case where the picture signal is inputted at the step S1. For example, when the image halt detecting unit 11 detects the power source state of the display apparatus, and the image feature data generating unit 12 receives the input of the picture signal from the tuner apparatus, even if the state is judged as No at the step S2, the picture signal continues to be inputted to the image feature data generating unit 12.

At the step S2, if the power source of the image viewing terminal 50 is judged to be on, the image feature data generating unit 12 calculates the image feature data in accordance with the input picture signal (Step S3). An example of the image feature data calculation at the step S3 is explained as follows. Here, a case where [Color Layout] noted in the non-patent document 1 is adopted as the image feature data is explained as an example. The color layout is represented by the following equation.

$$D=\{n_Y, Y_i(i=1,2,\ldots,n_Y), n_C, Cb_j, Cr_j(j=1,2,\ldots,n_C)\} \quad \text{[Equation 1]}$$

Here, nY is the number of brightness component coefficients, and nC is the number of color difference component coefficients. The nY is preferred to be 6, and the nC is preferred to be 3 or 6. Hereafter, the case of nY=6 and nC=3 is explained as an example. Also, $Y_i$, $Cb_j$ and $Cr_j$ are the values where the coefficients acquired by DCT conversion (Discrete Cosine Transform) from Y, Cb and Cr components) are respectively quantized.

The picture signal inputted to the image feature data generating unit 12 is the signal of the image broadcasted as a dynamic image. The image feature data generating unit 12 samples this picture signal and continuously extracts the images represented as static images. Then, the image (static image) acquired by sampling is divided. Here, a case of dividing into 64 (8×8) blocks is exemplified. The image feature data generating unit 12 extracts the Y, Cb, Cr components from each of the 64 divided blocks. Here, when the image is represented by R, G, B components, the conversion equation into the Y, Cb, Cr components from the R, G, B components may be used to calculate the Y, Cb, Cr components.

The image feature data generating unit 12 performs the DCT conversion on the Y component corresponding to the 64 respective blocks. FIG. 3A shows the example of the DCT conversion result for the Y component. Similarly, the image feature data generating unit 12 performs the DCT conversion on the Cb component and Cr component corresponding to the 64 respective blocks, respectively. FIG. 3B shows the example of the DCT conversion result for the Cb component. FIG. 3C shows the example of the DCT conversion result for the Cr component. Here, although FIG. 3A, FIG. 3B and FIG. 3C do not show the coefficients in all columns, the coefficients are calculated for each of 64 blocks.

The image feature data generating unit 12 extracts the nY (6 in this example) coefficients from the DCT conversion result for the Y component by carrying out the zigzag scan. That is, the Y1 to Y6 coefficients shown in FIG. 3A are extracted. Similarly, the image feature data generating unit 12 extracts the nC (3 in this example) coefficients from the DCT conversion result for the Cb component by carrying out the zigzag scan. That is, the Cb1 to Cb3 coefficients shown in FIG. 3B are extracted. Moreover, the image feature data generating unit 12 extracts the nC (3) coefficients from the DCT conversion result for the Cr component by carrying out the zigzag scan. That is, the Cr1 to Cr3 coefficients shown in FIG. 3C are extracted.

In succession, the image feature data generating unit 12 quantizes the coefficients Y1 to Y6, Cb1 to Cb3 and Cr1 to Cr3 which are extracted by the zigzag scan. Consequently, as the image feature data, the color layout represented by the equation (1) is obtained. Here, when the quantization is carried out, with regard to the direct current components (Y1, Cb1 and Cr1), they may be quantized, for example, at 6 bits, and with regard to the alternating currents (the coefficients except Y1, Cb1 and Cr1), they may be quantized, for example, at 5 bits.

The image feature data generating unit 12, after calculating the image feature data at the step S3, accumulates the image feature data in the buffer 14 (Step S4). Next, the image feature data generating unit 12 judges whether or not the buffer 14 has free space that can further store the image feature data (Step S5). If there is free space, the processes on and after the step S1 are repeated. On the other hand, if there is no free space in the buffer 14, the image feature data accumulated in the buffer 14 is transmitted from the image information transmitting unit to the viewing program specifying unit 23 of the viewing surveillance server 2 (Step S6). After the step S6, the image feature data generating unit 12 clears (erases) the image feature data stored in the buffer 14 (Step S7) and repeats the processes on and after the step S1.

Next, the operation in the viewing surveillance server 2 will be described. The individual image feature data generating units 21*a* to 21*c* corresponding to the respective channels sequentially receive the picture signals of the corresponding channels while the broadcast is executed, and calculate the image feature data similarly to the step S3. Then, each of the image feature data generating units 21*a* to 21*c* stores the calculated image feature data, in the buffer inside the program image feature data storing unit 22 (the buffer installed for the channel corresponding to each image feature data generating unit). In the buffer corresponding to each channel, each time a new image feature data is stored, the stored content is updated. When there is no free space in the buffer corresponding to each channel, the deletion is carried out in an order starting from the old image feature data, and the new image feature data is stored.

The viewing program specifying unit 23 estimates the degree of similarity between the image feature data received from the image information transmitting unit 13 of the viewing monitoring terminal 1 and each image feature data accumulated in the program image feature data storing unit 22 and estimates which of the programs is viewed. FIG. 4 is an explanation view showing the concept of the state when the viewing program specifying unit 23 compares the image feature data.

The program image feature data storing unit 22 has a buffer for storing the image feature data for each channel. The capacity (assumed to be S) of each buffer is equal to or larger than the capacity (assumed to be C) of the buffer 14 of the viewing monitoring terminal 1. That is, $C \leq S$. The viewing program specifying unit 23 extracts the image feature data corresponding to the capacity C (the capacity C of the buffer 14) from each buffer of the program image feature data storing unit 22, and compares with the image feature data (the capacity of this data is C) received from the image information transmitting unit 13 and then estimates the degree of similarity. When the degree of similarity estimating process is finished, the image feature data corresponding to the capacity C is extracted from another region of each buffer of the program image feature data storing unit 22. Then, the extracted image feature data is compared with the image feature data received from the image information transmitting unit 13, and the degree of similarity is estimated. Hereafter, similarly, the process for extracting the image feature data from the buffer of the program image feature data storing unit 22 and comparing with the image feature data received from the image information transmitting unit 13 and then estimating the degree of similarity is repeated. In this way, the repetition of the process is referred to as [the degree of similarity is estimated by setting a search window of the capacity C for the buffer of the program image feature data storing unit 22 and meanwhile shifting the search window inside the buffer of the program image feature data storing unit 22].

Also, the image feature data may be compared as described below. When the color layout is adopted as the image feature data, the difference (may be referred to as the distance) between the two image feature data (color layouts) is represented as below. Here a dash (') is not suffixed to the coefficient indicating one color layout, and the dash (') is suffixed to the other.

$$D = \sqrt{\sum_i w_{yi}(Y_i - Y'_i)^2} + \sqrt{\sum_i w_{bi}(Cb_i - Cb'_i)^2} + \sqrt{\sum_i w_{ri}(Cr_i - Cr'_i)^2}$$ [Equation 2]

so wyi, wbi and wri are weight coefficients, respectively, and an arbitrary numeral may be used. For example, in the calculation of the direct current component, [4] may be used. In the calculation of the second to third coefficients (Y2, Y3, Cb2, Cb3, Cr2 and Cr3), [2] may be used. And in the calculation of the fourth to sixth coefficients (Y4 to Y6), [1] may be used.

The viewing program specifying unit 23 calculates the average of the distance between the color layout received from the image information transmitting unit 13 and all of the color layouts included in the portion for which the search window is set in the buffer of the program image feature data storing unit 22, and uses the distance as the degree of similarity.

The viewing program specifying unit 23 sets the search window of the capacity C for the buffer of the program image feature data storing unit 22, and while shifting the search window inside the buffer of the program image feature data storing unit 22, estimates the degree of similarity and selects the portion (the portion inside the buffer of the program image feature data storing unit 22) where the distance of the color layout is equal to or lower than a threshold. When the portion where the distance of the color layout is equal to or lower than the threshold is only one, the program that serves as the base of the image feature data (color layout) stored in that part is specified as the program viewed by the viewer. Also, the channel is specified from that portion.

When the same program is broadcasted in a plurality of channels at the same time, or when the image feature data are accidentally similar although the contents of the images are different, there is a case that a plurality of portions where the distance of the color layout is equal to or lower than the threshold are specified. In this case, the program currently being viewed may be determined in accordance with the just previous viewing history of the viewer. That is, from the plurality of programs specified in accordance with the plurality of portions where the distance is equal to or lower than the threshold, the program of the same channel as the program specified as the program viewed by the viewer in the previous determination is determined to be the program currently being viewed by the viewer. This is because the viewer is usually considered to have the high possibility of continuing to view the same channel. Also, in the plurality of programs specified in accordance with the plurality of portions where the distance is equal to or lower than the threshold, if there is no program of the same channel as the program specified as the program viewed by the viewer in the previous determination, the program specified from the portion where the distance of the color layout is the shortest may be determined to be the program viewed by the viewer. Also, the viewing program specifying unit 23 specifies the channel from that portion.

Also, the viewing program specifying unit 23 specifies the portion where the distance of the color layout is the shortest, and if the distance of the color layout is equal to or lower than a threshold, the program serving as the base of the color layout stored in that portion may be specified as the program viewed by the viewer. Moreover, the channel is specified from that portion. This program specifying method can drop the processing cost of the viewing program specifying unit 23, because the process is simple.

In this way, according to the present invention, the image feature data is calculated from the image. Then, the image feature data calculated from the program viewed by the viewer and the image feature data calculated from each program are compared to carry out the viewing surveillance. Thus, since the image feature data is calculated from the image, the viewing surveillance can be executed, independently of the broadcast type such as the analog broadcast, the digital broadcast or the like. Also, it is not necessary to impose the limitation on the viewer, in which the viewer must use a sophisticated portable terminal, and the like. Also, since each broadcast station does not need to add the image code to the program, the operational burden on each broadcast station can be reduced.

Also, since the image feature data based on the image is used, the viewing surveillance can be performed even on the program where the feature of a sound output is difficult to appear because of the continuation of soundless state.

Also, the image feature data generating unit 12 does not calculate the image feature data when the power source of the image viewing terminal 50 is off, and calculates the image feature data only when the image halt detecting unit 11 detects that the power source of the image viewing terminal 50 is on. Thus, only while the viewer keeps the power source of the image viewing terminal 50 on, the viewing surveillance can be efficiently executed.

Moreover, if the power source of the image viewing terminal 50 is on, the image feature data generating unit 12 sequentially calculates the image feature data, and the image information transmitting unit 13 transmits the image feature data accumulated in the buffer 14 to the viewing program specifying unit 23. On the other hand, the image feature data generating units 21*a* to 21*c* sequentially receive the picture signals of the corresponding channels, while the broadcast is executed, and the image feature data is calculated and stored in the program image feature data storing unit 22. Thus, the channel and program which are viewed by the viewer can be specified substantially in real time. Since the result of the viewing surveillance acquired in real time is immediately provided to the broadcast station, the broadcast station can quickly carry out the consideration of the program organization (for example, the re-composition of the program organization).

In the above-mentioned explanation, the case of using the color layout as the image feature data is explained as an example. However, different information may be used as the image feature data. For example, [Motion Activity (hereafter, referred to as motion activity)] described in the non-patent document 1 may be used as the image feature data. The motion activity is represented by the following equation.

$$D=\{I,D,N_k(k=1,2,3)\} \quad \text{[Equation 3]}$$

Here, the magnitude I is calculated by determining the standard deviation from all motion vectors in the region and quantizing the standard deviation. For example, it may be classified into 5 levels from the lower standard deviation to the higher standard deviation and quantized to the 5 levels. A direction D is the maximum frequency direction when the angular component of the motion vector is focused on and quantized to 8 directions (45 degree steps). In calculating a continuity N, at first, elements where the magnitudes of the respective motion vectors included in the respective temporal and spatial regions are the average value or less are all set to 0. Next, the number where zeros acquired as the result are continuous in the temporal direction is totalized and classified into 3 stages (short, average and long) correspondingly to the lengths. Then, the frequencies classified into [short], [average] and [long] are respectively totalized. The short frequency is defined as N1, the average frequency is defined as N2, and the long frequency is defined as N3. Also, the difference (may be referred to as the distance) between the motion activities is represented as represented below.

$$D(D, D_a) = \left(I_a + \sum_{i=1}^{3} N_{ai}\right)\left(\frac{|I_a - I|}{I_a} + \sum_{i=1}^{3} \frac{|N_{ai} - N_i|}{N_{ai}}\right) \quad \text{[Equation 4]}$$

In the equation (4), the continuity in the direction D is represented as N, and the continuity in a direction Da is represented as Na.

The color layout and the motion activity are the exemplifications of the image feature data indicating the feature of the image. The image feature data is not limited to these kinds of information. Other than the color layout and the motion activity, the various information, such as a color histogram (where a rate of colors is indicated by a histogram representation), a representative color of an entire image, a design pattern, an edge distribution and the like can be used as the image feature data. Also, when the bit stream itself of the image being broadcasted is inputted from the image viewing terminal 50 to the image feature data generating unit 12, the entire bit stream or a part of the bit stream may be used as the image feature data.

In this embodiment, the image viewing terminal 50 corresponds to the graphic displaying terminal. The viewing monitoring terminal 1 corresponds to the viewing surveillance terminal. The image feature data generating unit 12 corresponds to the picture signal input unit and the image feature data generating unit. The image halt detecting unit 11 corresponds to the power source state detecting unit. The image information transmitting unit 13 corresponds to the transmitting unit. The image feature data generating units 21a to 21c correspond to the program image feature data generating unit. The program image feature data storing unit 22 corresponds to the program image feature data storing unit. The viewing program specifying unit 23 corresponds to the viewing program specifying unit.

Second Embodiment

Figure 5:
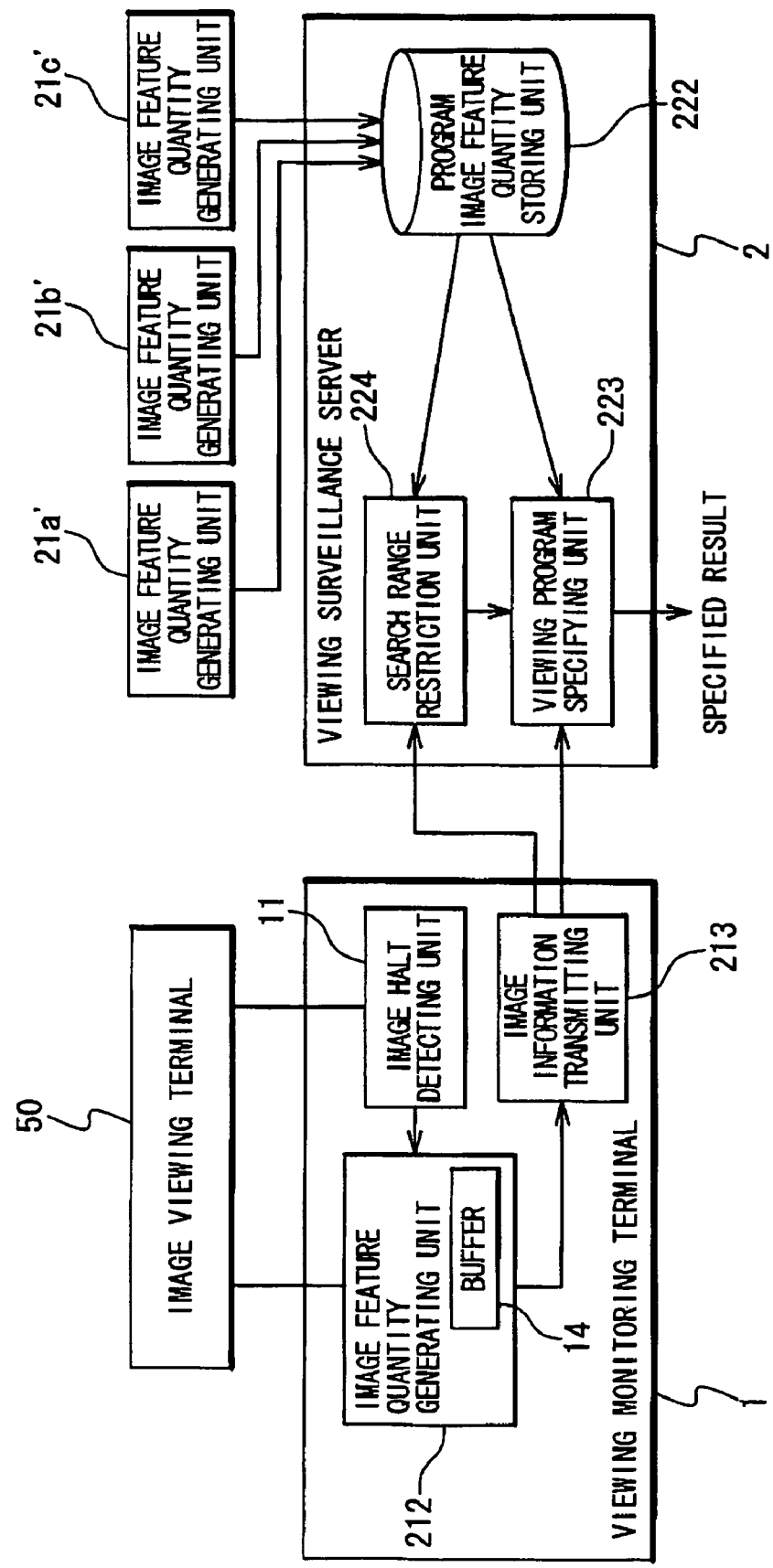
FIG. 5 is the block diagram showing the configuration in the second embodiment of the present invention.

FIG. 5 is a block diagram showing the configuration of the second embodiment of the present invention. The same symbols as FIG. 1 are given to the configuration portions similar to the first embodiment, and the explanations are omitted.

An image feature data generating unit 212 of the viewing monitoring terminal 1 receives a picture signal from the image viewing terminal 50, similarly to the image feature data generating unit 12 in the first embodiment, and calculates the image feature data. However, differently from the first embodiment, the time when the picture signal is inputted (namely, the time when the viewer views the image) together with the image feature data is stored in the buffer 14. An image information transmitting unit 213 transmits the image feature data stored in the buffer 14 to the viewing surveillance server 2, when the free space of the buffer 14 runs out. However, differently from the first embodiment, the image feature data generating unit 212 transmits the time information stored in the buffer 14 to a search range restriction unit 224 and transmits the image feature data to a viewing program specifying unit 223 of the viewing surveillance server 2. The image information transmitting unit 213, when transmitting the image feature data to the viewing program specifying unit 223, transmits the time when the picture signal serving as the base to calculate the image feature data is inputted to the image feature data generating unit 212, to the search range restriction unit 224.

Also, on the viewing surveillance server 2 side, respective image feature data generating units 21a' to 21c' store not only the image feature data but also the information of the times when the picture signals are inputted, in a program image feature data storing unit 222. The regions where the respective image feature data generating units 21a' to 21c' store the image feature data and the information of the picture signal reception times are the buffers installed for the channels corresponding to the respective image feature data generating units, similarly to the first embodiment. As a result, the program image feature data storing unit 222 stores the image feature data and reception time information with regard to the programs in all of the broadcast stations targeted for the surveillance, for each buffer corresponding to the channel. The image feature data generating units 21a' to 21c' may be installed in the viewing surveillance server 2, or may be installed at positions different from each other and configured so as to upload the generated image feature data to the program image feature data storing unit 22, as similar to the first embodiment.

The search range restriction unit 224 of the viewing surveillance server 2 restricts the range when the viewing program specifying unit 223 estimates the degree of similarity between the image feature data, in accordance with the time information received from the image information transmitting unit 213 of the viewing monitoring terminal 1 and the time information stored by the program image feature data storing unit 222. For example, the region where the image feature data until the time ascended by a predetermined time, from the time information received from the image information transmitting unit 213, are stored is restricted so as to be the target of the degree of similarity estimation.

The viewing program specifying unit 223 estimates the degree of similarity between the image feature data, within the range restricted by the search range restriction unit 224, and specifies the program viewed by the viewer.

In the above-mentioned configurations, the image feature data generating units 212 and 21a' to 21c' and the viewing program specifying unit 223 and the search range restriction unit 224 are realized, for example, by using CPU that is operated in accordance with programs. In this case, the programs are stored in ROM of the CPU and the like in advance. The viewing program specifying unit 223 and the search range restriction unit 224 may be realized by the same CPU that is operated in accordance with programs.

Next, the operations will be described. The operations of the viewing monitoring terminal 1 are similar to the operations shown in the flowchart of FIG. 2. However, at the step S3, the image feature data generating unit 212 stores not only the image feature data but also the time when the picture signal is received from the image viewing terminal 50 (the time when the viewer views the image) in the buffer 14. Also, at the step S6, the image information transmitting unit 213 transmits the image feature data stored in the buffer 14 to the viewing program specifying unit 223 and transmits the information of the time corresponding to the image feature data to the search range restriction unit 224.

As already explained, the program image feature data storing unit 222 stores the image feature data and reception time information with regard to the programs in all of the broadcast stations targeted for the surveillance, for each buffer corresponding to the channel. Also, this reception time is the time when each of the image feature data generating units 21a' to 21c' receives the picture signal, namely, the time when the program is actually broadcasted. In addition, the content stored in the buffer corresponding to the each channel of the program image feature data storing unit 222, is updated in each time the new image feature data is stored. Further, this each buffer is configured so as to be able to store the image feature data and reception times of the programs broadcasted in a certain period jointly. For example, the each buffer is configured so as to be able to store the image feature data and reception times of the programs corresponding to one day jointly. In the individual buffer, when the free space runs out, for example, the deletion is carried out in an order starting from the old information, and the new information is stored. That is, for example, a first-in first-out system is applied to store the image feature data and the time information.

For example, when each buffer of the program image feature data storing unit 222 stores the image feature data of the programs corresponding to one day, it is possible to estimate the degree of similarity between the program currently being viewed by the viewer and the image feature data of the programs broadcasted until one day before. Thus, even when the recorded program is replayed and viewed, the viewing surveillance of the program can be executed.

The search range restriction unit 224, when receiving the time information from the image information transmitting unit 213, restricts the region for storing the corresponding image feature data until the time ascended by a predetermined time (for example, 10 seconds) from that time, as the estimating range for the degree of similarity. For example, when the time information of [P:Q:30] is received from the image information transmitting unit 213, the search range restriction unit 224 restricts the region for storing the image feature data from [P:Q:20] to [P:Q:30], among the image feature data stored by the program image feature data storing unit 222, as the estimating range for the degree of similarity.

Within the region restricted by the search range restriction unit 224, the viewing program specifying unit 223 estimates the degree of similarity between the image feature data stored in the region and the image feature data received from the image information transmitting unit 213. Then, the viewing program specifying unit 223 specifies the portion where the degree of similarity is higher than a predetermined level (for example, the distance of the color layout is a predetermined threshold or less). Concretely, similarly to the first embodiment, the search window of the capacity C is set to the buffer of the program image feature data storing unit 22, and the degree of similarity is estimated while shifting the search window within the buffer of the program image feature data storing unit 222. However, the degree of similarity is estimated by shifting the search window only within the region restricted by the search range restriction unit 224.

If the portion where the degree of similarity is higher than a predetermined level is only one, the program serving as the base of the image feature data stored in that portion is specified as the program viewed by the viewer. Also, the channel is specified from that portion.

Also, when the same program is broadcasted in the plurality of channels at the same time, or when the image feature data are accidentally similar although the contents of the images are different, there is a case where a plurality of portions where the degree of similarity is equal to or higher than a predetermined level. In this case, the program currently being viewed may be estimated in accordance with the just previous viewing history of the viewer. That is, from the plurality of programs specified in accordance with the plurality of portions where the degrees of similarity are high, the program of the same channel specified as the program viewed by the viewer in the previous estimation may be judged to be the program currently being viewed by the viewer. This is because the viewer is typically considered to have the high possibility of continuing to view the same channel. Also, in the plurality of programs specified in accordance with the plurality of portions where the degree of similarity is high, when there is no program of the same channel as the program specified as the program viewed by the viewer in the previous estimation, the program specified from the portion where the degree of similarity is the highest may be judged to be the program viewed by the viewer. Also, the viewing program specifying unit 223 specifies the channel from that portion.

Let us suppose that the search range restriction unit 224 restricts the region for storing the corresponding image feature data until the time 10 seconds before the time when it is received from the image information transmitting unit 213, as the estimation range of the degree of similarity. In this case, even if the delay of about 10 seconds is induced in the time when a broadcast electric wave reaches the position of the viewer and the installation positions of the respective image feature data generating units 21a' to 21b', the viewing surveillance can be accurately executed. Also, here, the case where the search range restriction unit 224 restricts the region for storing the corresponding image feature data until the time 10 seconds before the reception time from the image information transmitting unit 213, as the estimation range for the degree of similarity is indicated. However, [10 Seconds] indicated here is an exemplification. For example, the range over a long time, such as one hour before the reception time from the image information transmitting unit 213, one day before, or one week before or the like, may be defined as the estimation range for the degree of similarity. In this case, as already explained, even in the case when the program recorded one week before (or, one day before, one hour before) or the like is replayed and viewed, that program can be specified. In this way, even if it is not the program currently being broadcasted, the program viewed by the viewer can be specified.

In this embodiment, the image viewing terminal 50 corresponds to the graphic displaying terminal. The viewing monitoring terminal 1 corresponds to the viewing surveillance terminal. The image feature data generating unit 212 corresponds to the picture signal input unit and the image feature data generating unit. The image halt detecting unit 11 corresponds to the power source state detecting unit. The image information transmitting unit 13 corresponds to the transmitting unit. The image feature data generating units 21a' to 21c' correspond to the program image feature data generating unit. The program image feature data storing unit 222 corresponds to the program image feature data storing unit. The viewing program specifying unit 23 corresponds to the viewing program specifying unit. The search range restriction unit 224 corresponds to the first degree of similarity estimation process target restriction unit.

Third Embodiment

Figure 6:
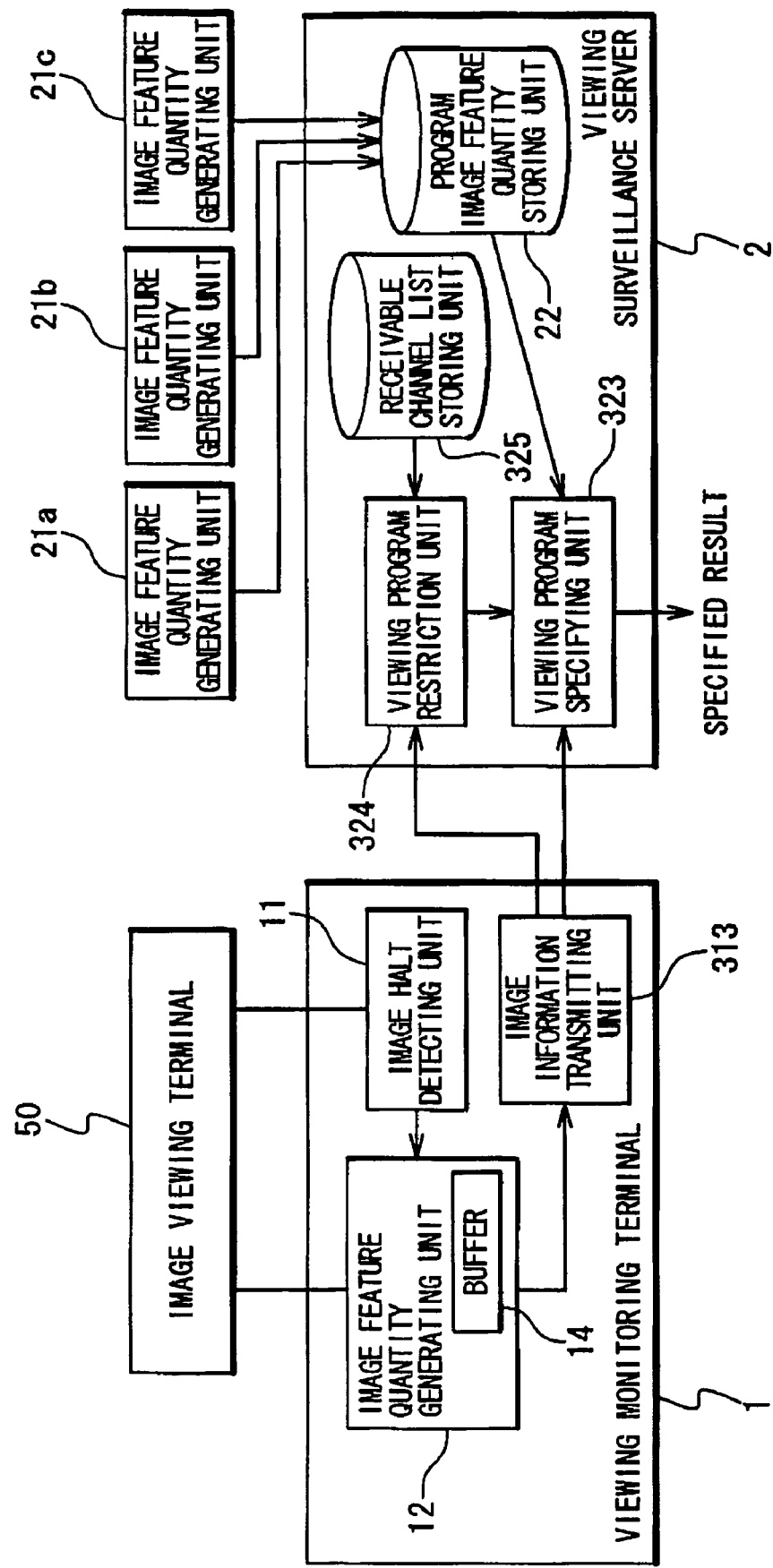
FIG. 6 is the block diagram showing the configuration in the third embodiment of the present invention.

FIG. 6 is a block diagram showing the configuration in the third embodiment of the present invention. The same symbols as FIG. 1 are given to the configuration portions similar to the first embodiment, and the explanations are omitted.

An image information transmitting unit 313 of the viewing monitoring terminal 1 transmits the image feature data to the viewing surveillance server 2, similarly to the image information transmitting unit 13 in the first embodiment. However, it not only transmits the image feature data to a viewing program specifying unit 323 but also transmits the position information of the viewing monitoring terminal (this position information is identical to the position information of the image viewing terminal 50) to a viewing program restriction unit 324 of the viewing surveillance server 2.

The image information transmitting unit 313 has, for example, a storing medium for storing the position information in advance, and when transmitting the image feature data, may read the position information from the storing medium and transmit to the viewing program restriction unit 324. Or, the viewing monitoring terminal 1 may include a GPS (Global Positioning System) antenna and a position calculating unit (not shown) through a GPS signal, and the position calculating unit may be configured to calculate the position information in accordance with the signal received at the GPS antennal. In this case, the image information transmitting unit 313, when transmitting the image feature data, may transmit the position information calculated by the position calculating unit, to the viewing program restriction unit 324.

Also, in the viewing surveillance server 2, a receivable channel list storing unit 325 stores a list table of the channel that can be received at each position. The viewing program restriction unit 324, when receiving the position information from the image information transmitting unit 313 of the viewing monitoring terminal 1, outputs the list table of the channel that can be received at the installation positions of the viewing monitoring terminal 1 and the image viewing terminal 50, in accordance with the position information and the list table stored by the receivable channel list storing unit 325, to the image information transmitting unit 313.

The viewing program specifying unit 323 specifies the buffer corresponding to the channel, which is outputted as the list table by the viewing program restriction unit 324, from the respective buffers of the program image feature data storing unit 22. Then, the viewing program specifying unit 323 compares the image feature data stored in the buffer and the image feature data received from the image information transmitting unit 313 of the viewing monitoring terminal 1 and estimates the degree of similarity. Then, the portion where the degree of similarity is higher than a predetermined level (for example, the distance of the color layout is a predetermined threshold or less) is specified. And the program serving as the base of the image feature data stored in that portion is specified. Also, the channel is specified from that portion.

The process where the viewing program specifying unit 323 estimates the degree of similarity and specifies the program and the channel is similar to the process of the viewing program specifying unit 23 in the first embodiment, except that the buffer of the estimation target of the degree of similarity is restricted to the buffer corresponding to the channel that can be received by the image viewing terminal 50, among the buffers of the program image feature data storing unit 22.

In the above-mentioned configuration, the image feature data generating units 12, 21a to 21c, the viewing program specifying unit 323 and the viewing program restriction unit 324 can be realized, for example, by using the CPU that is operated in accordance with the program. In this case, the program is stored in advance in the ROM and the like installed in the CPU. The viewing program specifying unit 323 and the viewing program restriction unit 324 may be realized by using the same CPU that is operated in accordance with the program.

According to the third embodiment, the estimation of the degree of similarity is not required to be performed on all of the buffers of the program image feature data storing unit 22. Only the image feature data stored in the buffer corresponding to the channel that can be received by the image viewing terminal 50 may be defined as the estimation target for the degree of similarity. Thus, the load of the estimating process for the degree of similarity can be reduced without any drop in the estimation precision of the degree of similarity.

In this embodiment, the image viewing terminal 50 corresponds to the graphic displaying terminal. The viewing monitoring terminal 1 corresponds to the viewing surveillance terminal. The image feature data generating unit 12 corresponds to the picture signal input unit and the image feature data generating unit. The image halt detecting unit 11 corresponds to the power source state detecting unit. The image information transmitting unit 313 corresponds to the transmitting unit. The image feature data generating units 21a to 21c correspond to the program image feature data generating unit. The program image feature data storing unit 22 corresponds to the program image feature data storing unit. The viewing program specifying unit 323 corresponds to the viewing program specifying unit. The receivable channel list storing unit 325 corresponds to the channel information storing unit. The viewing program restriction unit 324 corresponds to the second degree of similarity estimation process target restriction unit.

Fourth Embodiment

Figure 7:
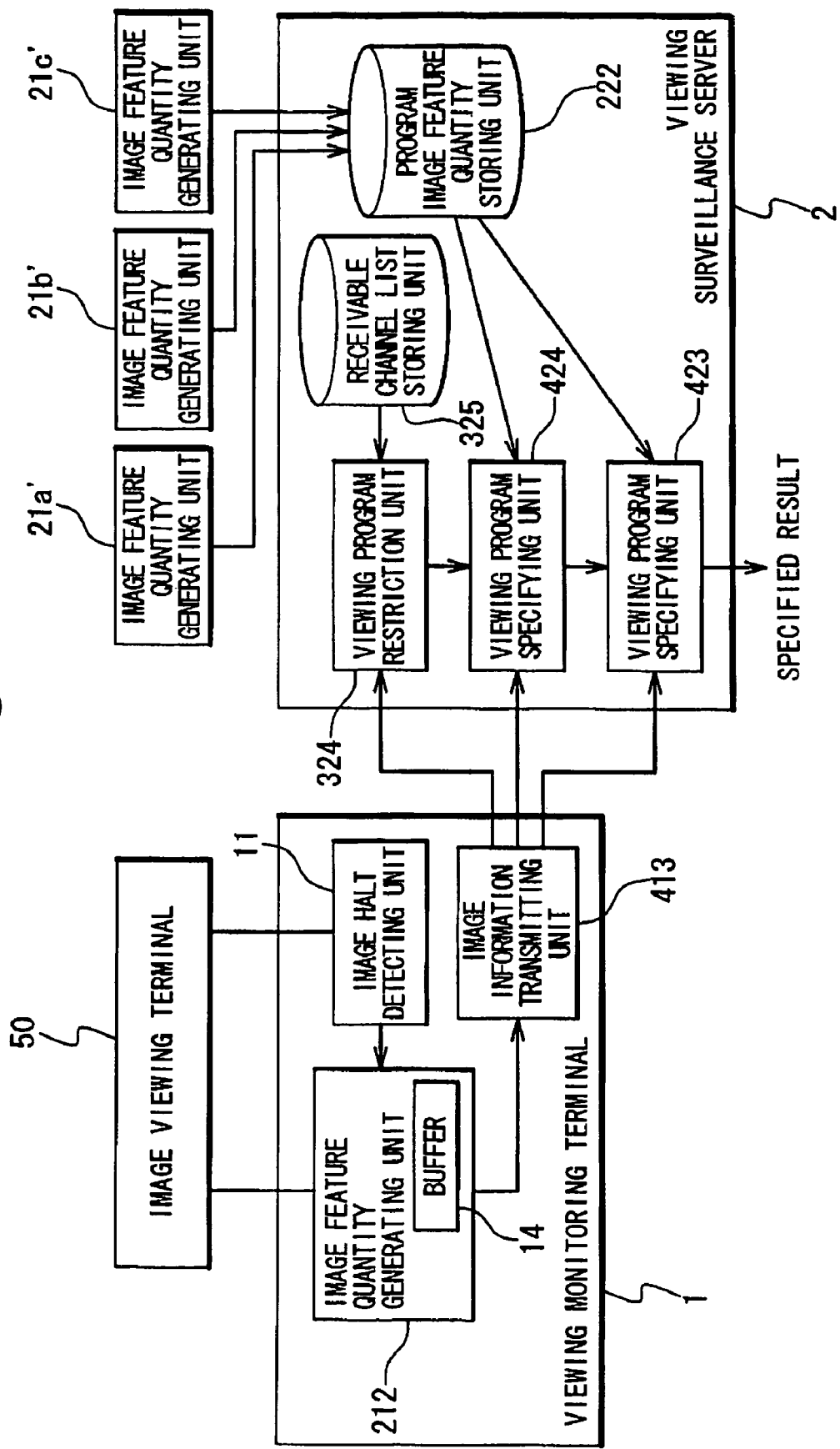
FIG. 7 is the block diagram showing the configuration in the fourth embodiment of the present invention.

FIG. 7 is a block diagram showing the configuration in the fourth embodiment of the present invention. The same symbols as FIG. 1, FIG. 5 or FIG. 6 are given to the configuration portions similar to any of the first embodiment to the third embodiments, and the explanations are omitted.

An image information transmitting unit 413 of the viewing monitoring terminal 1 transmits the image feature data to the viewing surveillance server 2, similarly to the image information transmitting unit 13 in the first embodiment. However, it not only transmits the image feature data to a viewing program specifying unit 423 but also transmits the position information of the viewing monitoring terminal (this position information is identical to the position information of the image viewing terminal 50) to the viewing program restriction unit 324 of the viewing surveillance server 2. Moreover, it transmits the information of the time when the picture signal is inputted to the image feature data generating unit 212 to a search range restriction unit 424 of the viewing surveillance server 2.

The process where the image information transmitting unit 413 transmits the time information to the search range restriction unit 424 is similar to the second embodiment. That is, when the image feature data generating unit 212 stores the image feature data in the buffer 14, the information of the time when the picture signal serving as the base of the image feature data is inputted is stored together with the image feature data. Then, when the image information transmitting unit 413 transmits the image feature data, the information of that time may be read out from the buffer 14 and transmitted to the search range restriction unit 424.

The process where the image information transmitting unit 413 transmits the position information to the viewing program restriction unit 324 is similar to the third embodiment. The image information transmitting unit 413 may include the storing medium that stores the position information in advance, and may read out the position information from the storing medium and transmit. Or, this may be configured so as to calculate the position information based on the GPS signal and transmit the position information to the viewing program restriction unit 324.

The program image feature data storing unit 222 stores the image feature data and reception time information (the information of the time when the image feature data generating units 21$a'$ to 21$c'$ receive the picture signals) with regard to the programs of the broadcast stations targeted for the surveillance, for each buffer corresponding to the channel, similarly to the second embodiment.

The viewing program restriction unit 324, when receiving the position information from the image information transmitting unit 413 of the viewing monitoring terminal 1, outputs the list table of the channel that can be received at the installation positions of the viewing monitoring terminal 1 and the image viewing terminal 50, in accordance with the position information and the list table stored in the receivable channel list storing unit 325, to the search range restriction unit 424.

The search range restriction unit 424 specifies the buffer corresponding to the channel, which is outputted as the list table by the viewing program restriction unit 324, from the respective buffers of the program image feature data storing unit 222. Moreover, the search range restriction unit 424 restricts the region for storing the corresponding image feature data until the time ascended by a predetermined time from the time of the time information received from the image information transmitting unit 413, in that specified buffer, as the estimation range for the degree of similarity.

Within the region restricted by the search range restriction unit 424, the viewing program specifying unit 423 estimates the degree of similarity between the image feature data stored in the region and the image feature data received from the image information transmitting unit 413. Then, it specifies the portion where the degree of similarity is higher than a predetermined level (for example, the distance of the color layout is a predetermined threshold or less). Moreover, the viewing program specifying unit 423 specifies the program and channel serving as the base of the image feature data stored in that portion. The process of the viewing program specifying unit 423 is the process similar to the process of the viewing program specifying unit 223 in the second embodiment.

In the above-mentioned configuration, the image feature data generating units 12, 21$a'$ to 21$c'$, the viewing program specifying unit 423, the search range restriction unit 424 and the viewing program restriction unit 324 are realized, for example, by using the CPU that is operated in accordance with the program. In this case, the program is stored in advance in the ROM and the like installed in the CPU. The viewing program specifying unit 423, the search range restriction unit 424 and the viewing program restriction unit 324 may be realized by using the same CPU that is operated in accordance with the program.

According to this embodiment, similarly to the third embodiment, without any drop in the estimation precision of the degree of similarity, the load of the estimation process for the degree of similarity can be reduced. Also, similarly to the second embodiment, the viewing surveillance can be accurately executed even if the delay is induced in the time when the broadcast electric wave reaches the position of the viewer and the installation positions of the respective image feature data generating units 21$a'$ to 21$b'$. Moreover, even when the recorded program is replayed and viewed, that program can be specified. In this way, even if the program currently not being broadcasted is viewed, the program viewed by the viewer can be specified.

In this embodiment, the image viewing terminal 50 corresponds to the graphic displaying terminal. The viewing monitoring terminal 1 corresponds to the viewing surveillance terminal. The image feature data generating unit 212 corresponds to the picture signal input unit and the image feature data generating unit. The image halt detecting unit 11 corresponds to the power source state detecting unit. The image information transmitting unit 413 corresponds to the transmitting unit. The image feature data generating units 21$a'$ to 21$c'$ correspond to the program image feature data generating unit. The program image feature data storing unit 222 corresponds to the program image feature data storing unit. The viewing program specifying unit 423 corresponds to the viewing program specifying unit. The receivable channel list storing unit 325 corresponds to the channel information storing unit. The search range restriction unit 424 corresponds to the channel information storing unit. The viewing program restriction unit 324 corresponds to the second degree of similarity estimation process target restriction unit.

Fifth Embodiment

Figure 8:
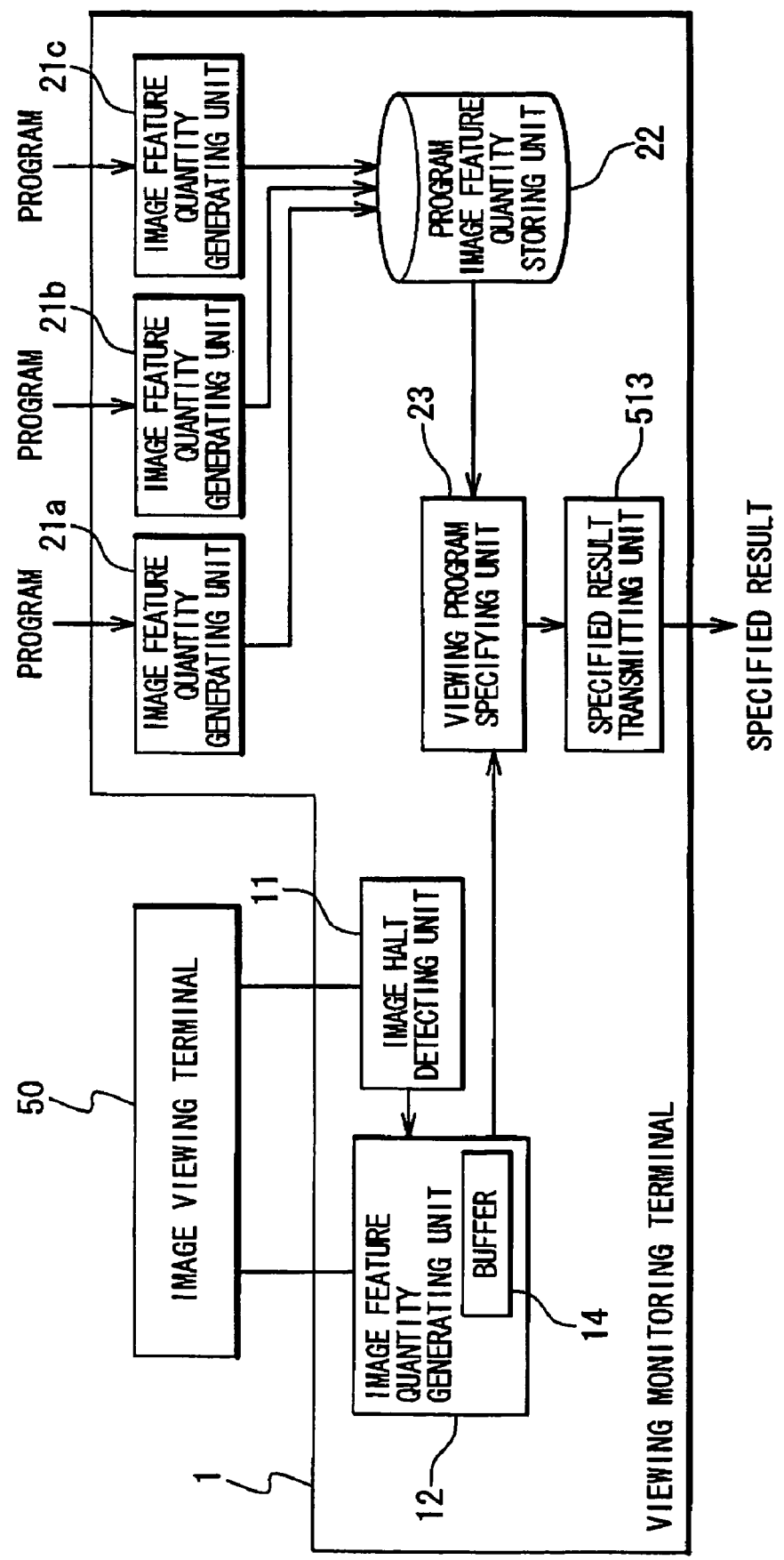
FIG. 8 is the block diagram showing the configuration in the fifth embodiment of the present invention.

FIG. 8 is a block diagram showing the configuration in the fifth embodiment of the present invention. The same symbols as FIG. 1 are given to the configuration portions similar to the first embodiment, and the explanations are omitted. This embodiment does not include the viewing surveillance server 2, differently from the first to fourth embodiments.

The viewing monitoring terminal 1 is installed in the image viewing terminal 50. The viewing monitoring terminal 1 includes the image halt detecting unit 11 and the image feature data generating unit 12. In addition, the viewing monitoring terminal 1 includes the program image feature data storing unit 22 and the viewing program specifying unit 23. The program image feature data storing unit 22 and the viewing program specifying unit 23 are the configuration units similar to the program image feature data storing unit 22 and the viewing program specifying unit 23, which are included in the viewing surveillance server 2 in the first embodiment. Moreover, the viewing monitoring terminal 1 includes the image feature data generating units 21$a$ to 21$c$. Those image feature data generating units 21a to 21c are the configuration units similar to the image feature data generating units 21a to 21c in the first embodiment.

Also, the viewing monitoring terminal 1 includes a specified result transmitting unit 513. The specified result transmitting unit 513 is the interface unit for transmitting the information specified by the viewing program specifying unit 23 (namely, the information of the program and channel viewed by the viewer) to the outside. The specified result transmitting unit 513 outputs the information of the program and channel viewed by the viewer, for example, to a terminal (not shown) of a manager for carrying out the viewing surveillance.

The process progress of the image halt detecting unit 11 and image feature data generating unit 12 in the viewing monitoring terminal 1 is similar to the process progress shown in the flowchart of FIG. 2. However, in the first embodiment, at the step S6, the image feature data generating unit 12 transmits the image feature data from the image information transmitting unit 13 to the viewing surveillance server 2. On the contrary, in this embodiment, at the step S6 of the flowchart shown in FIG. 2, the image feature data generating unit 12 transmits the image feature data to the viewing program specifying unit 23 included in the viewing monitoring terminal 1.

Also, irrespectively of the program of the channel received by the image viewing terminal 50, the picture signals of the corresponding channels are sequentially inputted to the individual image feature data generating units 21a to 21c corresponding to the respective channels, during the broadcast. Then, the respective image feature data generating units 21a to 21c calculate the image feature data similarly to the first embodiment and store the calculated image feature data in the buffers inside the program image feature data storing unit 22 (the buffers for the channels corresponding to the respective image feature data generating units), respectively.

The viewing program specifying unit 23 compares the image feature data received from the image feature data generating unit 12 and the image feature data stored in the buffer inside the program image feature data storing unit 22, and estimates the degree of similarity and then specifies the program and channel which are viewed by the viewer. The process where the viewing program specifying unit 23 estimates the degree of similarity and specifies the program and the channel is similar to the process of the viewing program specifying unit 23 in the first embodiment.

If the viewing program specifying unit 23 specifies the program and channel which are viewed by the viewer, the specified result transmitting unit 513 outputs the information of the specified result, for example, to the terminal (not shown) of the manager for carrying out the viewing surveillance.

In this embodiment, the image feature data generating units 12, 21a to 21c and the viewing program specifying unit 23 are realized, for example, by using the CPU that is operated in accordance with the program. In this case, the program is stored in advance in the ROM and the like installed in the CPU. The image feature data generating unit 12 and the viewing program specifying unit 23 may be realized by using the same CPU that is operated in accordance with the program.

In this embodiment, the effect similar to the first embodiment is achieved That is, in this embodiment, the image feature data is calculated from the image, the image feature data calculated from the program viewed by the viewer and the image feature data calculated from each program are compared, and the viewing surveillance is carried out. Thus, since the image feature data is calculated from the image, the viewing surveillance can be executed, independently of the broadcast type such as the analog broadcast, the digital broadcast or the like. Also, it is not necessary to impose the restriction on the viewer, in which the viewer must use the sophisticated portable terminal, and the like. Also, since each broadcast station does not need to add the image code to the program, the operational burden on each broadcast station can be reduced.

Also, since the image feature data based on the image is used, the viewing surveillance can be performed even on the program where the feature of the sound output is difficult to detect because of the continuation of soundless state.

Also, the image feature data generating unit 12 does not calculate the image feature data when the power source of the image viewing terminal 50 is off, and calculates the image feature data only when the image halt detecting unit 11 detects that the power source of the image viewing terminal 50 is on. Thus, only while the viewer keeps the power source of the image viewing terminal 50 on, the viewing surveillance can be efficiently executed.

Moreover, if the power source of the image viewing terminal 50 is on, the image feature data generating unit 12 sequentially calculates the image feature data and transmits the image feature data accumulated in the buffer 14 to the viewing program specifying unit 23. On the other hand, the image feature data generating units 21a to 21c sequentially receive the picture signals of the corresponding channels, while the broadcast is executed, and the image feature data is calculated and stored in the program image feature data storing unit 22. Thus, the channel and program viewed by the viewer can be specified in the substantial real time.

In the fifth embodiment, the viewing monitoring terminal 1 may have the search range restriction unit 224 in the second embodiment. In this case, the image feature data generating unit 12, when transmitting the image feature data to the viewing program specifying unit 23, transmits the time when the picture signal serving as the base to calculate that image feature data, to the search range restriction unit 224. The search range restriction unit 224 restricts the region for storing the corresponding image feature data until the time ascended by the predetermined time from that time, as the estimation range for the degree of similarity, similarly to the second embodiment. The viewing program specifying unit 23 may estimate the degree of similarity in the range restricted by the search range restriction unit 224 and specify the program and the channel. With this configuration, the effect similar to the second embodiment is also achieved.

In this embodiment, the image viewing terminal 50 corresponds to the graphic displaying terminal. The viewing monitoring terminal 1 corresponds to the viewing surveillance terminal. The image feature data generating unit 12 corresponds to the picture signal input unit and the image feature data generating unit. The image halt detecting unit 11 corresponds to the power source state detecting unit. The image feature data generating units 21a to 21c correspond to the program image feature data generating unit. The program image feature data storing unit 22 corresponds to the program image feature data storing unit. The viewing program specifying unit 23 corresponds to the viewing program specifying unit. Also, in the case of the configuration where the search range restriction unit 224 is included, the search range restriction unit 224 corresponds to the degree of similarity estimation process target restriction unit.

Sixth Embodiment

Figure 9:
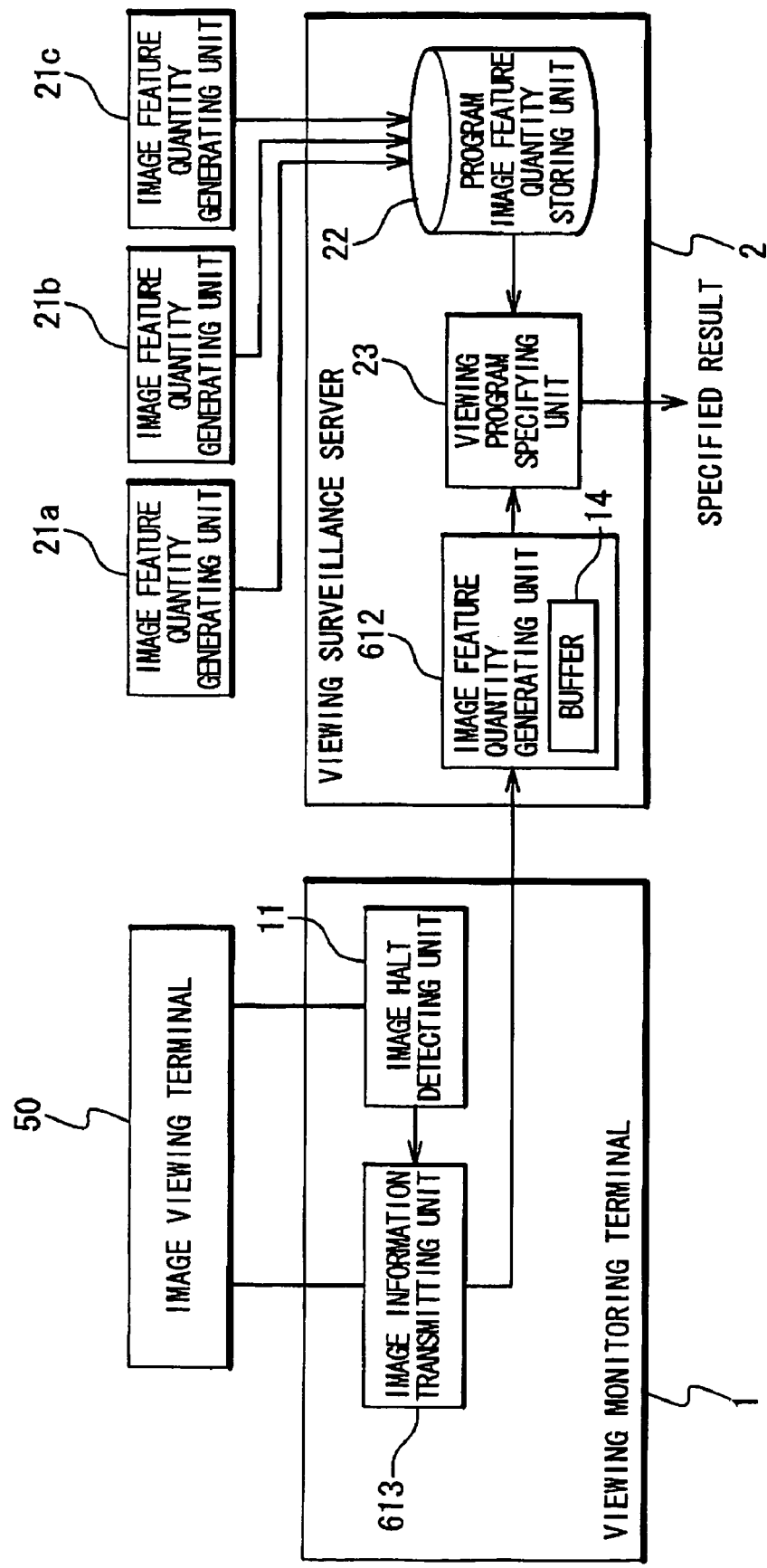
FIG. 9 is the block diagram showing the configuration in the sixth embodiment.

FIG. 9 is a block diagram showing the configuration in the sixth embodiment. The same symbols as FIG. 1 are given to the configuration portions similar to the first embodiment, and the explanations are omitted.

The viewing monitoring terminal 1 has an image information transmitting unit 613 and the image halt detecting unit 11. The image information transmitting unit 613 receives the picture signal of the image viewed by the viewer, from the image viewing terminal 50, similarly to the image feature data generating unit 12 in the first embodiment. The image information transmitting unit 613 samples the picture signal inputted from the image viewing terminal 50 and transmits to an image feature data generating unit 612 of the viewing surveillance server 2. The image information transmitting unit 613 can transmit the picture signal to the image feature data generating unit 612 by using a streaming technique and the like at this time. Also, the image information transmitting unit 613 may reduce a picture size of a picture represented by the picture signal and then transmit to the image feature data generating unit 612. By using these kinds of transmitting manners, the data quantity that is transmitted to the viewing surveillance server 2 from the viewing monitoring terminal 1 can be reduced.

In addition, the image halt detecting unit 11 detects the power source state of the image viewing terminal 50 and reports the detected result to the image information transmitting unit 613. The image information transmitting unit 613 transmits the picture signal (sampled picture signal) to the image feature data generating unit 612, only when the power source of the image viewing terminal 50 is on.

The viewing surveillance server 2 has the image feature data generating unit 612, the viewing program specifying unit 23 and the program image feature data storing unit 22. The viewing program specifying unit 23 and the program image feature data storing unit 22 are the configuration portions similar to the viewing program specifying unit 23 and the program image feature data storing unit 22 in the first embodiment. Also, the operations of the respective image feature data generating units 21a to 21c for storing the image feature data in the program image feature data storing unit 22 are similar to the operations of the respective image feature data generating units 21a to 21c in the first embodiment.

The image feature data generating unit 612, when receiving the picture signal from the image information transmitting unit 613, calculates the image feature data based on the picture signal and stores in the buffer 14. Moreover, if the free space, which enables the image feature data to be stored, on the buffer 14 runs out, the image feature data generating unit 612 outputs the image feature data stored in the buffer to the viewing program specifying unit 23, and clears the image feature data in the buffer 14.

The viewing program specifying unit 23 compares the image feature data received from the image feature data generating unit 612 and the image feature data stored in the buffer in the program image feature data storing unit 22, estimates the degree of similarity and specifies the program and channel which are viewed by the viewer. This process is similar to the process of the viewing program specifying unit 23 in the first embodiment.

In this embodiment, the image feature data generating units 612, 21a to 21c and the viewing program specifying unit 23 are realized, for example, by using the CPU that is operated in accordance with the program. In this case, the program is stored in advance in the ROM and the like of the CPU. The image feature data generating unit 612 and the viewing program specifying unit 23 may be realized by using the same CPU that is operated in accordance with the program.

Also in this embodiment, the effect similar to the first embodiment is achieved.

In the sixth embodiment, the viewing surveillance server 2 may have the search range restriction unit 224 in the second embodiment. In this case, the image information transmitting unit 613, when transmitting the picture signal to the image feature data generating unit 612, transmits the time when the picture signal is inputted to the image information transmitting unit 613, to the search range restriction unit 224. The search range restriction unit 224 restricts the region for storing the corresponding image feature data until the time ascended by the predetermined time from that time, as the estimation range for the degree of similarity, similarly to the second embodiment. The viewing program specifying unit 23 may estimate the degree of similarity in the range restricted by the search range restriction unit 224 and specify the program and the channel. With this configuration, the effect similar to the second embodiment is also achieved.

Moreover, in the sixth embodiment, the viewing surveillance server 2 may have the receivable channel list storing unit 325 in the third embodiment, and the viewing program restriction unit 324. In this case, the image information transmitting unit 613 transmits the position information of the image viewing terminal 50 to the viewing program restriction unit 324, similarly to the third embodiment. The position information may be stored in advance or may be calculated by using the GPS signal. The viewing program restriction unit 324, when receiving the position information, outputs the list table of the channel that can be received at the installation positions of the viewing monitoring terminal 1 and the image viewing terminal 50, to the viewing program specifying unit 23, in accordance with the position information and the list table stored by the receivable channel list storing unit 325, similarly to the third embodiment. The viewing program specifying unit 23 specifies the buffer corresponding to the channel, which is outputted as the list table by the viewing program restriction unit 324, from the buffers of the program image feature data storing unit 22. Then, it compares the image feature data stored in the buffer and the image feature data received from the image information transmitting unit 313 of the viewing monitoring terminal 1 and estimates the degree of similarity. With this configuration, the effect similar to the third embodiment is also achieved.

In this embodiment, the image viewing terminal 50 corresponds to the graphic displaying terminal. The viewing monitoring terminal 1 corresponds to the viewing surveillance terminal. The image information transmitting unit 613 corresponds to the image transmitting unit. The image halt detecting unit 11 corresponds to the power source state detecting unit. The image feature data generating units 21a to 21c correspond to the program image feature data generating unit. The program image feature data storing unit 22 corresponds to the program image feature data storing unit. The viewing program specifying unit 23 corresponds to the viewing program specifying unit. Also, in the case of the configuration where the search range restriction unit 224 is included, the search range restriction unit 224 corresponds to the first degree of similarity estimation process target restriction unit. Also, in the case of the configuration where the receivable channel list storing unit 325 and the viewing program restriction unit 324 are included, the receivable channel list storing unit 325 corresponds to the channel information storing unit, and the viewing program restriction unit 324 corresponds to the first degree of similarity estimation process target restriction unit.

In addition, in the second to sixth embodiments, the various kinds of information, such as the color layout, the motion activity and the like, can be used as the image feature data, similarly to the first embodiment.

Also, in the first to sixth embodiments, it is possible to perform the viewing surveillance on the television broadcast, by totalizing the viewing results from many viewing monitoring terminals 1.

INDUSTRIAL USABILITY

The present invention can be applied to the viewing surveillance system and viewing surveillance terminal, which support both of the analog broadcast and the digital broadcast. Also, it can be applied in the system for carrying out the viewing surveillance of the television broadcast in the real time (instantly) and quickly executing the re-composition of the program organization and the like. Also, it can be used in the system which can specify the program viewed by the viewer, even if the program is not currently broadcasted. Moreover, it can be applied in the viewing surveillance of the streaming broadcast by receiving the streaming broadcast which can be accessed through the Internet instead of the television broadcast.

The invention claimed is:

1. A viewing surveillance system comprising:
a viewing surveillance terminal installed in a graphic displaying terminal for displaying an image of a program to be broadcasted;
a viewing surveillance server connected to said viewing surveillance terminal; and
a program image feature quantity generating unit generating an image feature quantity, which is information indicating a feature of said image for each program of each channel, based on a picture signal of said program broadcasted in each channel,
wherein said viewing surveillance terminal includes:
a picture signal input unit to which said picture signal of said image displayed by said graphic displaying terminal is inputted from said graphic displaying terminal;
an image feature quantity generating unit generating an image feature quantity, which is information indicating a feature of said image displayed by said graphic displaying terminal based on said picture signal inputted to said picture signal input unit; and
a transmitting unit transmitting said image feature quantity generated by said image feature quantity generating unit to said viewing surveillance server, and
said viewing surveillance server includes:
a program image feature quantity storing unit storing said image feature quantity generated by said program image feature quantity generating unit; and
a viewing program specifying unit specifying said program displayed by said graphic displaying terminal or said channel broadcasting said program by estimating a degree of similarity between said image feature quantity transmitted by said transmitting unit and each said image feature quantity stored by said program image feature quantity storing unit,
wherein said transmitting unit transmits information of a time when said picture signal is inputted to said picture signal input unit from said graphic displaying terminal, together with said image feature quantity generated based on said picture signal, to said viewing surveillance server,
said program image feature quantity generating unit stores information of said time when said picture signal of said program is received, together with said image feature quantity generated based on said picture signal in said program image feature quantity storing unit, and
said viewing surveillance server further includes a first degree of similarity estimation process target restriction unit determining a target of an estimation process of said degree of similarity by said viewing program specifying unit based on information of said time received from said transmitting unit and information of a time stored by said program image feature quantity storing unit,
wherein said program image feature quantity storing unit stores said image feature quantity generated by said program image feature quantity generating unit for each said channel,
said transmitting unit transmits a position information indicating a position of said graphic displaying terminal together with said image feature quantity to said viewing surveillance server, and
said viewing surveillance server further includes:
a channel information storing unit storing a list information of said channel that can be received at respective positions; and
a second degree of similarity estimation process target restriction unit determining a target of an estimation of said degree of similarity by said viewing program specifying unit by specifying said channel that can be received by said graphic displaying terminal based on said position information of said graphic displaying terminal received from said transmitting unit and said list information.

2. The viewing surveillance system according to claim 1, wherein said viewing surveillance terminal includes a power source state judging unit judging whether a power source of said graphic displaying terminal is on or off, and
said image feature quantity generating unit generates said image feature quantity of said image displayed by said graphic displaying terminal when said power source of said graphic displaying terminal is judged to be on.

3. A viewing surveillance terminal comprising:
a picture signal input unit to which a picture signal of an image is inputted from a graphic displaying terminal for displaying said image of a program to be broadcasted;
an image feature quantity generating unit generating an image feature quantity that is information indicating a feature of said image displayed by said graphic displaying terminal based on said picture signal inputted to said picture signal input unit; and
a transmitting unit transmitting said image feature quantity generated by said image feature quantity generating unit to a viewing surveillance server for specifying said program corresponding to said image or a channel broadcasting said program based on said image feature quantity,
wherein said transmitting unit transmits information of a time when said picture signal is inputted to said picture signal input unit from said graphic displaying terminal together with said image feature quantity generated based on said picture signal to said viewing surveillance server, and
wherein said transmitting unit transmits position information indicating a position of said graphic displaying terminal together with said image feature quantity generated based on said picture signal to said viewing surveillance server.

4. The viewing surveillance terminal according to claim 3, further comprising:
a power source state judging unit judging whether a power source of said graphic displaying terminal is on or off,
wherein said image feature quantity generating unit generates said image feature quantity of said image displayed by said graphic displaying terminal when said power source of said graphic displaying terminal is judged to be on.

5. A viewing surveillance server comprising:
a program image feature quantity generating unit generating an image feature quantity which is information indicating a feature of an image for each program of each channel based on a picture signal of said program broadcasted in each said channel;
a program image feature quantity storing unit storing said image feature quantity generated by said program image feature quantity generating unit for each said channel; and
a viewing program specifying unit receiving said image feature quantity which is information indicating said feature of said image displayed by a graphic displaying terminal from a viewing surveillance terminal installed in said graphic displaying terminal for displaying said image of said program to be displayed and specifying said program displayed by said graphic displaying terminal or said channel broadcasting said program by estimating a degree of similarity between said received image feature quantity and each said image feature quantity stored by said program image feature quantity storing unit,
wherein said program image feature quantity storing unit stores information of a time when said program image feature quantity generating unit receives said picture signal of said program together with said image feature quantity generated based on said picture signal, and
said viewing surveillance server further comprising:
a first degree of similarity estimation process target restriction unit which receives information of a time when said graphic displaying terminal receives said picture signal and said image feature quantity generated based on said picture signal from said viewing surveillance terminal and determining a target of an estimation process of said degree of similarity by said viewing program specifying unit based on information of received said time and information of a time stored by said program image feature quantity storing unit;
a channel information storing unit storing a list information of said channel that can be received at respective positions; and
a second degree of similarity estimation process target restriction unit receiving a position information of said graphic displaying terminal from said viewing surveillance terminal, determining a target of an estimation process of said degree of similarity by said viewing program specifying unit by specifying said channel that can be received by said graphic displaying terminal based on said position information of said graphic displaying terminal and said list information.

6. A viewing surveillance system comprising:
a viewing surveillance terminal installed in a graphic displaying terminal for displaying an image of a program to be broadcasted;
a viewing surveillance server connected to said viewing surveillance terminal; and
a program image feature quantity generating unit generating an image feature quantity which is information indicating a feature of said image for each program of each channel based on a picture signal of said program broadcasted in each said channel,
wherein said viewing surveillance terminal includes:
an image transmitting unit transmitting said picture signal of said image displayed by said graphic displaying terminal to said viewing surveillance server,
said viewing surveillance server includes:
an image feature quantity generating unit generating said image feature quantity of said image displayed by said graphic displaying terminal based on said picture signal transmitted from said image transmitting unit;
a program image feature quantity storing unit storing said image feature quantity generated by said program image feature quantity generating unit; and
a viewing program specifying unit specifying said program displayed by said graphic displaying terminal or said channel broadcasting said program by estimating said degree of similarity between said image feature quantity generated by said program image feature quantity generating unit and each said image feature quantity stored by said program image feature quantity storing unit,
wherein said image transmitting unit transmits information of a time when said picture signal is inputted from said graphic displaying terminal, together with said picture signal of said image displayed by said graphic displaying terminal, to said viewing surveillance server,
said program image feature quantity generating unit stores information of a time when said picture signal of said program is received, together with said image feature quantity generated based on said picture signal, in said program image feature quantity storing unit,
said viewing surveillance server includes a first degree of similarity estimation process target restriction unit determining a target of an estimation process of said degree of similarity by said viewing program specifying unit based on information of said time received from said image transmitting unit and information of said time stored by said program image feature quantity storing unit,
wherein said viewing surveillance terminal includes a position information transmitting unit transmitting a position information indicating a position of said graphic displaying terminal to said viewing surveillance server,
said program image feature quantity storing unit stores said image feature quantity generated by said program image feature quantity generating unit for each said channel,
said viewing surveillance server includes:
a channel information storing unit storing a list information of said channel that can be received at respective positions; and
a second degree of similarity estimation process target restriction unit determining a target of an estimation process of said degree of similarity by said viewing program specifying unit by specifying said channel that can be received by said graphic displaying terminal based on said position information received from said position information transmitting unit and said list information.

7. The viewing surveillance system according to claim 6, wherein said viewing surveillance terminal includes a power source state judging unit judging whether a power source of said graphic displaying terminal is on or off, and
said image transmitting unit transmits said picture signal of said image displayed by said graphic displaying terminal to said viewing surveillance server when said power source of said graphic displaying terminal is judged to be on.

8. A viewing surveillance server comprising:
an image feature quantity generating unit receiving a picture signal of an image displayed by a graphic displaying terminal for displaying said image of a program to be broadcasted, from a viewing surveillance terminal installed in said graphic displaying terminal, and generating an image feature quantity which is information indicating a feature of said image displayed by said graphic displaying terminal based on said picture signal;
a program image feature quantity generating unit generating an image feature quantity, which is information indicating a feature of said image, for each program of each channel;
a program image feature quantity storing unit storing said image feature quantity generated by said program image feature quantity generating unit; and
a viewing program specifying unit specifying said program displayed by said graphic displaying terminal or said channel broadcasting said program by estimating a degree of similarity between said image feature quantity generated by said image feature quantity generating unit and each said image feature quantity stored by said program image feature quantity storing unit,
wherein said program image feature quantity storing unit stores information of a time when said program image feature quantity generating unit receives said picture signal of said program, together with said image feature quantity generated by said program image feature quantity generating unit,
said viewing surveillance server further comprising a first degree of similarity estimation process target restriction unit that determines a target of an estimation process of said degree of similarity by said viewing program specifying unit based on information of received said time and information of said time stored by said program image feature quantity storing unit,
wherein said program image feature quantity storing unit stores said image feature quantity generated by said program image feature quantity generating unit for each said channel,
said viewing surveillance server further comprising:
a channel information storing unit storing a list information of said channel that can be received at a plurality of respective positions; and
a second degree of similarity estimation process target restriction unit that receives a position information of said graphic displaying terminal from said viewing surveillance terminal, and determines a target of an estimation process of said degree of similarity by said viewing program specifying unit by specifying said channel that can be received by said graphic displaying terminal based on said position information of said graphic displaying terminal and said list information.

9. A viewing surveillance terminal comprising:
a picture signal input unit to which a picture signal of an image of a program is inputted from a graphic displaying terminal for displaying said image of said program to be broadcasted;
an image feature quantity generating unit generating an image feature quantity which is information indicating a feature of said image based on said picture signal inputted to said picture signal input unit;
a position information transmitting unit transmitting a position information indicating a position of said graphic displaying terminal,
a program image feature quantity generating unit generating said image feature quantity of said image of said program for each channel based on said picture signal of said program broadcasted in each channel;
a program image feature quantity storing unit storing said image feature quantity generated by said program image feature quantity generating unit for each said channel; and
a viewing program specifying unit specifying said program displayed by said graphic displaying terminal or said channel broadcasting said program by estimating a degree of similarity between said image feature quantity generated by said image feature quantity generating unit and each said image feature quantity stored by said program image feature quantity storing unit, wherein said program image feature quantity generating unit storing information of a time when said picture signal of said program is received together with said image feature quantity generated based on said picture signal in said program image feature quantity storing unit, and
said viewing surveillance terminal further comprising:
a degree of similarity estimation process target restriction unit determining a target of an estimation process of said degree of similarity by said viewing program specifying unit based on said position information received from said position information transmitting unit and said time when said picture signal is inputted from said graphic displaying terminal to said picture signal input unit and information of said time stored by said program image feature quantity storing unit.

10. The viewing surveillance terminal according to claim 9, further comprising:
a power source state detecting unit judging whether a power source of said graphic displaying terminal is on or off,
wherein said image feature quantity generating unit generates said image feature quantity of said image displayed by said graphic displaying terminal when said power source of said graphic displaying terminal is judged to be on.

* * * * *